United States Patent
Kaanta et al.

(10) Patent No.: US 12,343,749 B2
(45) Date of Patent: Jul. 1, 2025

(54) APPARATUS FOR ELECTROSPRAY EMISSION

(71) Applicant: Accion Systems, Inc., Boston, MA (US)

(72) Inventors: Bradley Kaanta, Boston, MA (US); Adam Zachar, Boston, MA (US); Louis Perna, Boston, MA (US)

(73) Assignee: Accion Systems, Inc., Boston, MA (US)

( * ) Notice: Subject to any disclaimer, the term of this patent is extended or adjusted under 35 U.S.C. 154(b) by 600 days.

(21) Appl. No.: 17/216,425

(22) Filed: Mar. 29, 2021

(65) Prior Publication Data

US 2021/0299684 A1 Sep. 30, 2021

Related U.S. Application Data

(60) Provisional application No. 63/001,026, filed on Mar. 27, 2020.

(51) Int. Cl.
*B05B 5/025* (2006.01)
*B64G 1/40* (2006.01)
*H01J 27/00* (2006.01)

(52) U.S. Cl.
CPC .............. *B05B 5/025* (2013.01); *B64G 1/413* (2023.08); *H01J 27/00* (2013.01)

(58) Field of Classification Search
CPC ..... B05B 5/025; B05B 5/0255; B05B 5/0533; B05B 5/0536; B05B 1/14; H01J 27/00
See application file for complete search history.

(56) References Cited

U.S. PATENT DOCUMENTS

| | | | |
|---|---|---|---|
| 6,551,557 B1 * | 4/2003 | Rose | B01L 3/0244 73/864.31 |
| 7,690,325 B2 * | 4/2010 | Henderson | B01L 3/0248 118/313 |
| 8,030,621 B2 | 10/2011 | Lozano et al. | |
| 8,207,496 B2 * | 6/2012 | Makarov | H01J 49/0018 250/288 |
| 8,785,881 B2 | 7/2014 | Lozano et al. | |
| 9,793,477 B2 | 10/2017 | Wang et al. | |
| 9,969,158 B2 | 5/2018 | Stark et al. | |
| 10,105,705 B2 * | 10/2018 | Chen | G01N 21/645 |
| 2003/0111599 A1 * | 6/2003 | Staats | G01N 27/44782 250/288 |
| 2003/0146757 A1 | 8/2003 | Aguero et al. | |
| 2005/0178960 A1 | 8/2005 | Kameoka et al. | |

(Continued)

FOREIGN PATENT DOCUMENTS

WO WO-2019102894 A1 * 5/2019
WO 2020236961 A1 11/2020

OTHER PUBLICATIONS

Cisquella-Serra, Albert , et al., "Lifetime and performance enhancement of silicon-based microfabricated electrospray thrusters", Presented at the 37th International Electric Propulsion Conference, Massachusetts Institute of Technology, Cambridge, MA, USA, Jun. 19-23, 2022.

(Continued)

*Primary Examiner* — Christopher R Dandridge
(74) *Attorney, Agent, or Firm* — Jeffrey Schox; Randy Mehlenbacher

(57) ABSTRACT

An electrospray apparatus comprising a capillary emitter.

12 Claims, 13 Drawing Sheets

(56) References Cited

U.S. PATENT DOCUMENTS

| | | | |
|---|---|---|---|
| 2010/0025575 A1 | 2/2010 | Demmons et al. | |
| 2011/0101122 A1 | 5/2011 | Oleschuk et al. | |
| 2012/0043460 A1* | 2/2012 | Wouters | H01J 49/0404 |
| | | | 250/288 |
| 2012/0280141 A1* | 11/2012 | Kovtoun | H01J 49/167 |
| | | | 250/424 |
| 2012/0291702 A1 | 11/2012 | Stark et al. | |
| 2018/0201395 A1 | 7/2018 | Jung-Kubiak et al. | |

OTHER PUBLICATIONS

Corrado, Matthew N., et al., "Densification of Ionic Liquid Electrospray Thrusters using Silicon-Based MEMS Fabrication", Presented at the International Electric Propulsion Conference, Massachusetts Institute of Technology, Cambridge, MA, USA, Jun. 19-23, 2022.

Ramos, Raul, et al., "Degradation mitigation strategies in electrospray thrusters based on chemically robust thin films", Presented at the 37th International Electric Propulsion Conference, Massachusetts Institute of Technology, Cambridge, MA, USA, Jun. 19-23, 2022.

Takao, Yoshinori, et al., "High-Current-Density Ionic Liquid Electrospray Thruster with a Nano-Capillary Emitter Array", Presented at the 37th International Electric Propulsion Conference, Massachusetts Institute of Technology, Cambridge, MA, USA, Jun. 19-23, 2022.

Andrews, Heather, "Shaped Beams from Diamond Field-Emitter Array Cathodes", IEEE Transactions on Plasma Science, vol. 48, No. 7, Jul. 2020 2671.

Ataman, Caglar "Wafer-Level Integrated Electrospray Emitters for a Pumpless Microthruster System Operating in High Efficiency Ion-Mode" MEMS 2012, Paris, France, Jan. 29-Feb. 2, 2012.

B. Legrand et al., "Silicon NANO-ESI Emitters for Mass Spectrometry: A Mixed Micromechanical and Microfluidic Design," Transducers 2007—2007 International Solid-State Sensors, Actuators and Microsystems Conference, 2007, pp. 791-794.

Dandavino, S. ",Microfabricated electrospray emitter arrays with integrated extractor and accelerator electrodes for the propulsion of small spacecraft" doi:10.1088/J.Micromech. Microeng. 24 (2014) 075011 (13pp) 0960-1317/24/7/075011.

Gassend, Blaise et al. "A Microfabricated Planar Electrospray Array Ionic Liquid Ion Source With Integrated Extractor", Journal of Microelectromechanical Systems, vol. 18, No. 3, Jun. 2009.

Gibson, Graham T.T. et al. "Nanoelectrospray Emitters: Trends and Perspective", Published online May 28, 2009 in Wiley InterScience (www.interscience.wiley.com) DOI 10.1002/mas.20248.

Giubileo, Filippo "Field Emission from Carbon Nanostructures" Appl. Sci. 2018, 8, 526; doi:10.3390/app8040526.

Grustan-Gutierrez, E et al. "Time-of-Flight Characterization of a Microfabricated Electrospray Thruster Emitter Array" The 35th International Electric Propulsion Conference, Georgia Institute of Technology, USA Oct. 8-12, 2017.

Grustan-Gutierrez, Enric et al. "Microfabricated Electrospray Thruster Array with High Hydraulic Resistance Channels" Journal of Propulsion and Power vol. 33, No. 4, Jul.-Aug. 2017.

Inoue, Naok et al. "Fabrication of a high-density emitter array for electrospray thrusters using field emitter array process" Japanese Journal of Applied Physics 58, SEEG04 (2019).

Krpoun, R. et al. "Tailoring the hydraulic impedance of out of-plane micromachined electrospray sources with integrated electrodes" Cite as: Appl. Phys. Lett. 94, 163502 (2009); https://doi.org/10.1063/1.3117191.

Krpoun, R et al. "Microfabricated Out-of-Plane Arrays of Integrated Capillary Nano-Electrospray Emitters" Transducers 2009, Denver, CO, USA, Jun. 21-25, 2009.

Lenguito, G. et al. "Multiplexed Electrospray for Space Propulsion Applications" 46th AIAA/ASME/SAE/ASEE Joint Propulsion Conference & Exhibit Jul. 25-28, 2010, Nashville, TN.

Lenguito, Giovanni et al. "Pressure-Driven Operation of Microfabricated Multiplexed ElectroSprays of Ionic Liquid Solutions for Space Propulsion Applications" Journal of Microelectromechanical Systems, vol. 23, No. 3, Jun. 2014 689.

Nguyen, Giang T. H. "Nanoscale Ion Emitters in Native Mass Spectrometry for Measuring Ligand-Protein Binding Affinities" ACS Cent. Sci. 2019, 5, 308-318.

Olvera-Trejoab, D. "Additively manufactured MEMS multiplexed coaxial electrospray sources for high-throughput, uniform generation of core-shell microparticles" DOI: 10.1039/c6lc00729e.

Scarano, Fulvio et al. "Three-dimensional evolution of flow structures in transitional circular and chevron jets" Physics of Fluids 23, 124104 (2011).

Smith, Melissa A. et al. "Design, simulation, and fabrication of three-dimensional microsystem components using grayscale photolithography" J. Micro/Nanolith. MEMS MOEMS 18(4), 043507 (Oct.-Dec. 2019).

Velásquez-García, Luis Fernando et al. "A Planar Array of Micro-Fabricated Electrospray Emitters for Thruster Applications", Journal of Microelectromechanical Systems, vol. 15, No. 5, Oct. 2006.

Yuill, Elizabeth M. "Electrospray Ionization from Nanopipette Emitters with Tip Diameters of Less than 100 nm" dx.doi.org/10.1021/ac402214g | Anal. Chem. 2013, 85, 8498-8502.

* cited by examiner

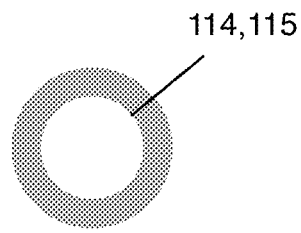
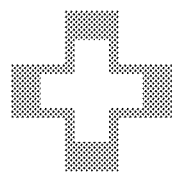
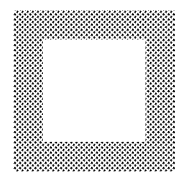
FIGURE 4A      FIGURE 4B      FIGURE 4C
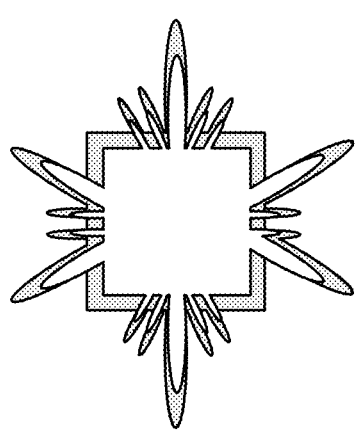
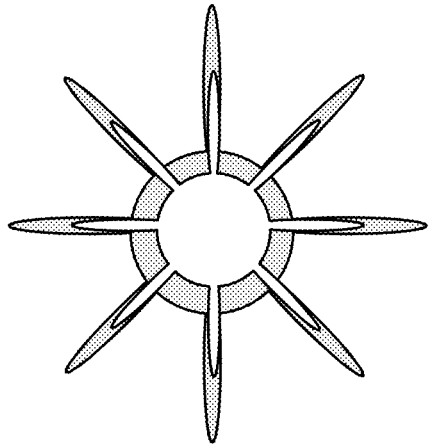
FIGURE 4D      FIGURE 4E
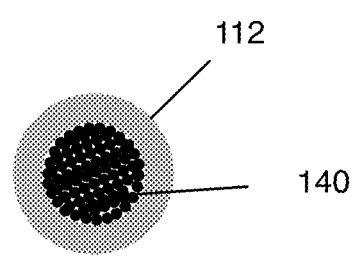
FIGURE 5

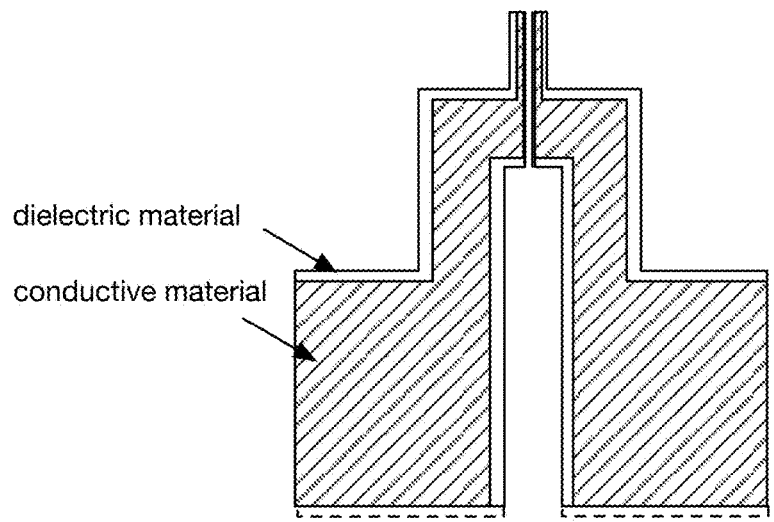
FIGURE 10
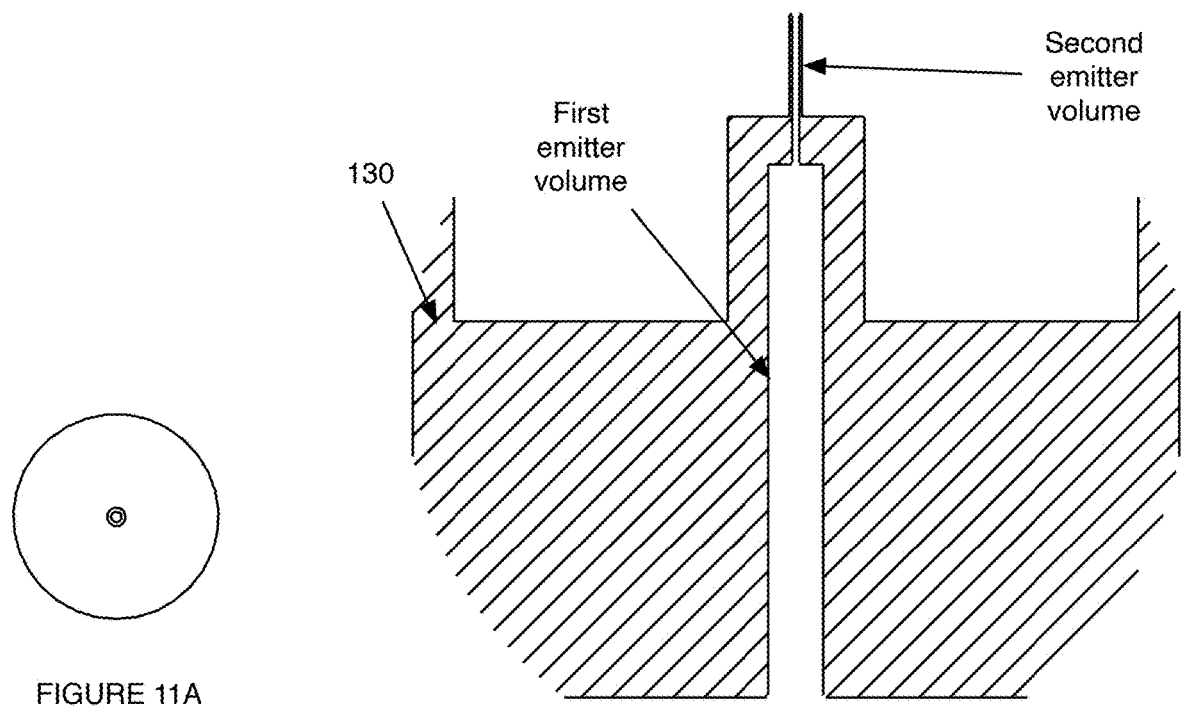
FIGURE 11A
FIGURE 11B

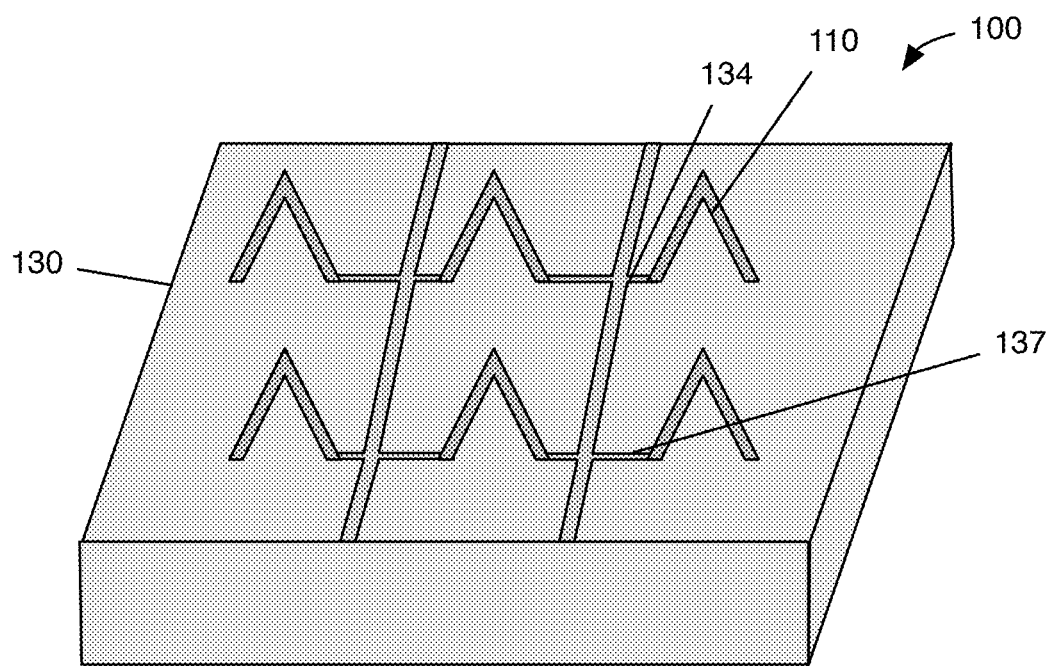
FIGURE 14
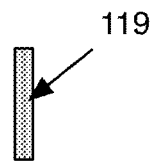
FIGURE 15A            FIGURE 15B
FIGURE 15C

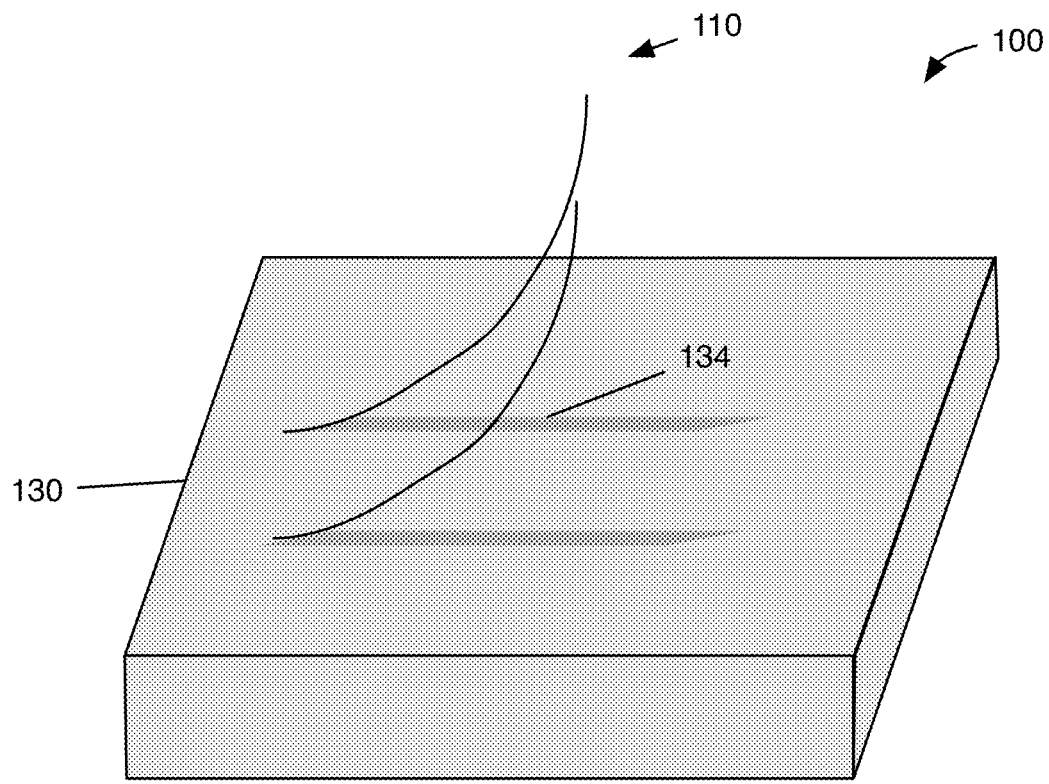
Figure 20
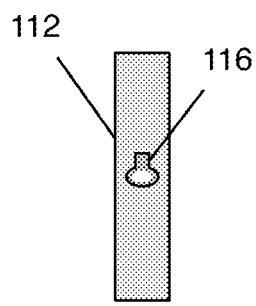 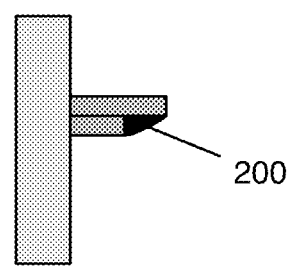
Figure 21A  Figure 21B

APPARATUS FOR ELECTROSPRAY EMISSION

CROSS-REFERENCE TO RELATED APPLICATIONS

This application claims the benefit of U.S. Provisional Application No. 63/001,026, filed 27 Mar. 2020, which is incorporated in its entirety by this reference.

TECHNICAL FIELD

This invention relates generally to the electrospray emission field, and more specifically to a new and useful system and method of manufacture in the electrospray emission field.

BRIEF DESCRIPTION OF THE FIGURES

FIGS. 4A-4E are schematic representations of example egress and/or ingress port geometries.

FIG. 5 is a schematic representation of an example of a capillary that includes porous material.

FIG. 10 is a schematic representation of an emitter cross section example.

FIGS. 11A and 11B are a top down and cutaway view of an example of the emitter, respectively.

FIG. 14 is a schematic representation of an example of an emitter array on a substrate.

FIGS. 15A-15C are schematic representations of a front, side, and top view of an example emitter, respectively.

FIG. 20 is a schematic representation of an exemplary cantilever emitter array.

FIGS. 21A and 21B are elevation front and elevation right schematic representations of an exemplary protrusion in a side wall of an emitter, respectively.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
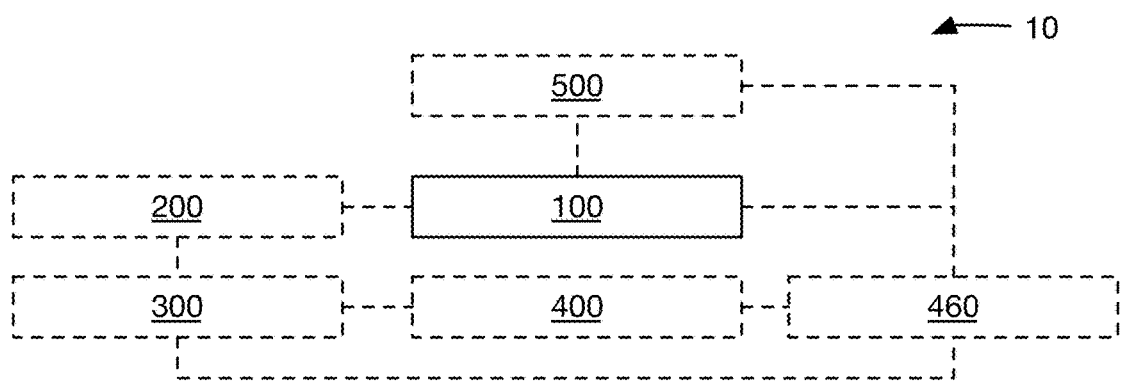
FIG. 1 is a schematic representation of the system.

As shown in FIG. 1, the electrospray emission apparatus 10 includes one or more emitter arrays 100. The apparatus can optionally include one or more: control systems 400, reservoirs 300, working materials 200, counter electrodes 500, and/or any suitable components.

Figure 12:
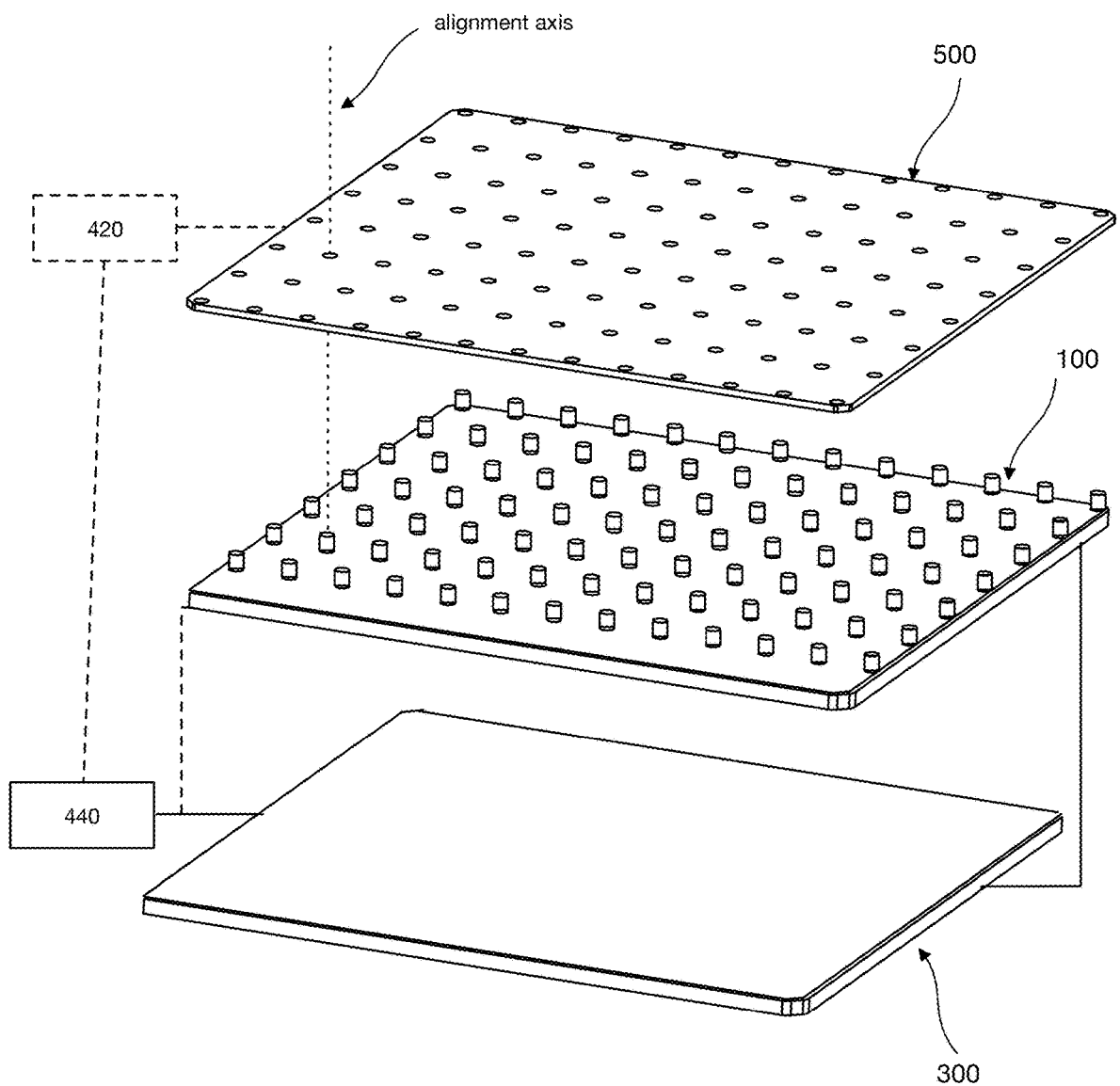
FIG. 12 is a schematic representation of an example of the emitter array coupled to a counter electrode.

The emitter array(s) are preferably coupled to one or more counter electrodes 500 (e.g., extractor electrodes, accelerator electrodes, etc.), example shown in FIG. 12. The counter electrode preferably functions to establish an electric field to produce an electrospray. The emitter array is preferably aligned to (e.g., matches) counter electrode apertures (e.g., each emitter positions is aligned to coincide with a counter electrode aperture, a plurality of emitters are aligned to coincide with a counter electrode aperture, etc.), but can be arranged in any suitable manner. The counter electrode apertures can be circular, polygonal (e.g., square, rectangular, hexagonal, etc.), oblong, elliptical, oval, ovi-form, and/or have any suitable shape. Each counter electrode aperture can correspond to (e.g., be aligned to) one or more emitters (e.g., egress port). The counter electrode can be electrically isolated from the working material and/or emitters. The counter electrode can include one or more electrically conductive, semiconductive, and/or nonconductive materials (e.g., made of tungsten, gold-titanium-coated silicon, etc.). In a specific example, the counter electrode can include a coating (e.g., a nonconductive coating) that covers any suitable surface area between 0-100% of the counter electrode. In some embodiments, the counter electrodes can be connected to (e.g., mounted to, extend from, etc.) the emitter apparatus (e.g., from the substrate). The distance between the counter electrode and the emitter (e.g., emitter tip, emitter apex) can be any value between about 1 μm and 10 mm such as 2 μm, 5 μm, 10 μm, 20 μm, 50 μm, 100 μm, 200 μm, 500 μm, 1 mm, 2 mm, 5 mm, 10 mm, or values therebetween; less than 1 μm, and/or greater than 10 mm. However, the apparatus can be coupled to any suitable external system and/or components.

The apparatus for electrospray emission is preferably integrated into an ion propulsion system (e.g., a thruster operable in low earth orbit). The apparatus preferably functions to propel mass in a microgravity/zero gravity environment. Alternatively, the apparatus can be used in biomedical fields (e.g., injection needles), electrospray (e.g., as an ion beam source for microscopy, spectroscopy, etc.), to induce wetting behavior, electrospinning, ion beam etching, ion beam deposition, ion beam implantation, and/or in any other suitable field.

2. Benefits

Variations of the technology can confer several benefits and/or advantages.

First, variants of the technology can mitigate the risk of failure due to excess fluid flow and/or liquid accumulation and spread. In a specific example, the use of well-defined egress ports as working material emission sites (e.g., as opposed to emission from a surface that includes connected pores) can mitigate the risk of failure due to excess fluid flow and/or liquid accumulation and spread. In a second specific example, guard emitters (e.g., emitters that do not normally emit, emitters that are not directly connected to working material in a reservoir, etc.) within the emitter array can act to stop or slow fluid spread and can act as externally wetted emitters to pin and/or transport and emit working material.

Second, variants of the technology can provide protection from electrochemically-induced failure. In a first example, the use of dielectric materials for all surfaces in intentional (e.g., internal walls) and/or unintentional contact (e.g., external walls) with the working material can minimize chemical reactions between the emitter and the working material, which can mitigate: gas bubble generation (e.g., which can lead to uncontrolled liquid expulsion or electrical gas discharge), solid generation (e.g., which can clog capillaries), and solid material corrosion (e.g., which can lead to leakage or collapse). In a second example, the inlet face, emitter exterior, and/or inter-emitter material can be coated with or made from a non-conducting material. In a third example, any conductive material can be driven at the same or similar (such as varies by less than ±0.001%, ±0.005%, ±0.01%, ±0.05%, ±0.1%, ±0.5%, ±1%, ±2%, ±5%, ±10%, ±20%, etc. of the voltage; voltage difference is ±0.01 V, ±0.05V, ±0.1 V, ±0.5V, ±1 V, ±5V, etc.; etc.) electrical potential as the working material, thereby decreasing (e.g., minimizing) the risk of electrochemical reactions. For instance, the bulk silicon of the emitters can be driven to the same potential as the working material, which can minimize liquid-silicon reactions.

Third, variants of the technology can increase wetting reliability of working material within the emitter (e.g., within the manifold of the emitter). In a first specific example, the geometric cross-section of the emitter capillaries can be chosen to draw working material into the emitter. In a second example, when the support material includes conductive material, an electrical potential can be driven between the working material and the support material (e.g., different electric potentials, different timings for applying electric potentials, etc.). This electrical potential can drive electrowetting, electrostatic attraction, electroosmotic flow, and/or otherwise improve wetting of the working material within the capillary.

Fourth, variants of the technology can have reduced or minimal electric field suppression. In a specific example, having dielectric material proximal (e.g., coating, in contact with, surrounding, etc.) the egress port (as opposed to or in addition to conductive material) can decrease or remove the chance that the electric field terminates within the emitter (as opposed to the generally desired termination of the electric field within the working material). In contrast, when a capillary is a conductor, some of the E-field lines can terminate on the capillary rather than on the working material, reducing the electric stress concentration for the liquid. The reduced electric field suppression can additionally or alternatively be beneficial for increasing a density (densification) of or reducing a distance between emitters.

However, variants of the technology can confer any other suitable benefits and/or advantages.

3. System

The emitter array 100 preferably functions to emit working material, for example in a plume (e.g., a stable plume, unstable plume), in droplets, in a stream, and/or in any suitable flow. The working material can be emitted as individual ions, ion clusters (e.g., ranging from 2 to 100 molecules), droplets, and/or in any suitable quantity. The flow can be continuous, pulsed, intermittent, random, periodic, and/or have any suitable timing. The flow can be constant or varying. The working material preferably follows a flow path from a reservoir through a manifold (e.g., wherein the working material enters the manifold through an ingress port) and out an egress port toward a counter electrode. However, the working material flow path can bypass the manifold (e.g., directly from the reservoir and/or substrate toward the counter electrode such as by externally wetting one or more emitters), by following a channel, and/or follow any suitable path.

Figures 18A, 18B:
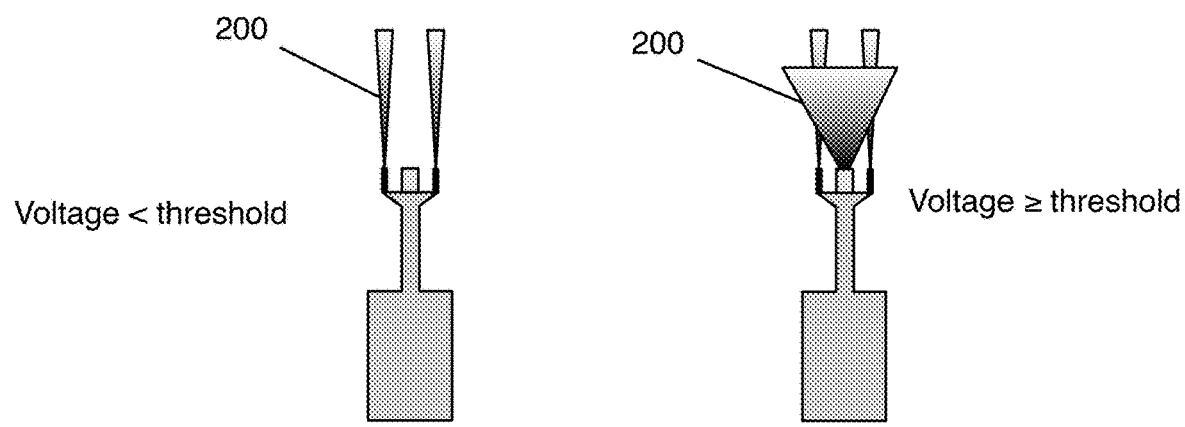
FIGS. 18A and 18B are schematic representations of an example emitter as shown in FIGS. 17A-17C operating in a first and second mode, respectively.

In variants, the emitter array can emit in more than one emission mode. The emission modes can be passively (e.g., based on characteristics such as structure or material of one or more emitters, based on the working material, based on passive electronics, etc.) and/or actively controlled. In examples of actively controlled emission modes, the emission mode can be controlled by controlling a flow rate (e.g., by actuating a flow control mechanism), a voltage, a temperature, a pressure, and/or by modulating any suitable parameter. The emission modes can include a high temperature mode, low temperature mode, high charge to mass ratio mode, low charge to mass ratio mode, a high voltage mode, a low voltage mode, a high thrust mode, a low thrust mode, a high specific impulse mode ($I_{sp}$), a low $I_{sp}$ mode, and/or any suitable mode. For example, the emitter array can emit individual ions from the working material in a high charge to mass ratio mode and (charged) droplets of working material in a low charge to mass ratio mode. In this example, the modes of operation can be selected based on a voltage (e.g., counter electrode voltage, predetermined voltage from the control system, etc.). As shown for example in FIGS. 18A and 18B, different emission modes can be facilitated by having a plurality of egress ports on an emitter. The emission of working material can depend on the sharpness of the emitter (e.g., the sharpness of conductive material proximal the egress port), a capillary size (e.g., an egress port diameter), and/or other characteristics of the egress port (particularly those that impact a local electric field). For instance, smaller diameter egress ports can emit working material at lower voltages relative to larger diameter egress ports (e.g., for comparable sharpness). In these examples, when the voltage is less than a threshold voltage, working material is emitted from a first emission site and when the voltage is greater than or equal to the threshold voltage, working material can be emitted from the first emission site and a second emission site. In variations of these examples, emission from the second site (e.g., any emission, a threshold emission, etc.) can modify (e.g., regulate, decrease, increase, prevent, change, etc.) the emission from the first site. However, an emitter can otherwise operate or be operable in multiple emission modes.

The emitter array 100 is preferably coupled to the working material 200. The emitter array is preferably in fluid communication with a reservoir 300 (e.g., directly, indirectly such as via manifolds, pipes, etc.). However, a subset of the emitter array can be in fluid communication with the reservoir (e.g., a first plurality of the emitters is in fluid communication with the reservoir and a second plurality of the emitters is not in fluid communication with the reservoir, a first plurality of the emitters is in fluid communication with the reservoir and a second plurality of the emitters is in fluid communication with a second reservoir, etc.), the emitter array (and/or a subset of the emitter) can be in communication with more than one reservoir, and/or the emitter array can otherwise be coupled to the working material.

The emitter array preferably includes a substrate 130 that functions to support the emitter(s) 110. However, the emitter array can be distributed across more than one substrate. As shown for example in FIGS. 9A and 9B, the emitter array (e.g., a manifold thereof) can be arranged through a substrate. Additionally or alternatively, the emitter array can be arranged above and/or below the substrate. However, the emitter array can be free-standing and/or have any suitable arrangement. The substrate can be conductive, insulating (e.g., dielectric), semiconducting, and/or have any suitable electrical properties.

The substrate (and/or emitters) can optionally include a coating (e.g., a conductive coating, an insulating coating, a dielectric coating, etc.). The coating can be solid, porous, be patterned, and/or have any suitable morphology. The coating thickness is preferably between about 0.01-500 µm such as 10 nm, 20 nm, 50 nm, 100 nm, 200 nm, 500 nm, 1 µm, 2 µm, 5 µm, 10 µm, 20 µm, 50 µm, 100 µm, 200 µm, 300 µm, 500 µm, or values therebetween, but can be thinner than 10 nm, and/or thicker than 500 µm. The coating can conformally and/or partially coat the substrate and/or emtters. For instance, the coating can be applied to a patterned or predetermined portion (e.g., to the manifolds) of the substrate and/or emitter. However, the coating can be applied to any suitable surfaces of the substrate and/or emitter. In a specific example, an electrical pathway can be patterned (e.g., with the coating) to enable one or more emitters (e.g., the support material of the emitters) to be driven to an electrical potential. In a second illustrative example, the substrate and/or emitters can include a porous silicon oxide coating. However, the substrate can include any suitable structures.

The substrate can be flat (e.g., planar) and/or curved. The substrate can be porous (e.g., include pores that can absorb working material), define one or more manifolds (e.g., each manifold aligned with and/or coupled to one or more emitters), include a reservoir (e.g., one or more regions of the substrate that are configured to store working material such as a pool), and/or can be arranged in any manner that couples working material to the emitters.

The manifolds can: pass through the substrate, be defined in one or more surfaces of the substrate (e.g., a surface of the substrate that emitters are arranged on, a side of the substrate, a surface of the substrate that emitters are not arranged on, etc.). The manifolds can expose the working material to an external environment proximal the substrate (e.g., be a vented or open manifold) or not expose the working material to the external environment (e.g., be an internal manifold). The manifolds can include sharp, acuate, rounded, and/or other corner structures. The lateral and/or longitudinal extent of the manifolds can be between 1 µm and 10 mm such as 1 µm, 2 µm, 5 µm, 10 µm, 20 µm, 50 µm, 100 µm, 200 µm, 500 µm, 1 mm, 2 mm, 5 mm, 10 mm, or values therebetween. However, the lateral and/or longitudinal extent of the manifolds can be less than 1 µm, greater than 10 mm, and/or any suitable value.

In a first specific example, the substrate can include one or more channels 134 which can function to provide working material to the emitters. The channels can be fed with working material by through apertures in the substrate (e.g., bottom-fed, back-fed, etc.), side fed (e.g., by working material fed to the channels along one or more side or edge of the substrate), fed by pools in the substrate, fed by working material adsorbed by the substrate, and/or otherwise be fed with working material. In a variation of the first specific example (as shown for example in FIG. 14), the channel can include a plurality of distributaries where each distributary can be coupled to an emitter of the emitter array and where the distributary can feed working material from the channel to the emitter coupled to it. However, additionally or alternatively, each emitter can be fed by a plurality of distributaries, one or more emitters can not be fluidly coupled to the channels (e.g., guard emitters can be fluidly isolated from one or more channels, guard emitter can be fluidly isolated from the working material, guard emitters can be fluidly isolated from the manifold, etc.), and/or the emitters can otherwise be fluidly coupled to the channels.

The channels can be formed by valleys in the substrate (e.g., trenches), by walls built on the substrate, be regions of the substrate with a surface roughness configured to wet working material (e.g., where other regions of the substrate have a surface roughness that does not wet working material), and/or can otherwise be formed. In some variants, the walls can have sharp edges (e.g., radius of curvature less than about 1 nm, 10 nm, 100 nm, 1 µm, 10 µm, >10 µm, values therebetween, as shown for example in FIG. 16B), which can promote wetting of the channel with working material. However, the walls can additionally or alternatively have curved edges, and/or any suitable edges.

In a second specific example, the substrate can include apertures (e.g., through holes) which can be the same as and/or coupled to ingress ports of the emitter.

However, the manifolds can otherwise be arranged.

The substrate can be electrically conductive, semiconducting, and/or insulating. Examples of substrate materials include: group IV elements (e.g., carbon, silicon, germanium, tin, lead, etc.), binary compounds (e.g., III-V compounds such as gallium arsenide; II-VI compounds such as zinc telluride; oxides such as copper (II) oxide, silicon dioxide ($SiO_2$), etc.; etc.), tertiary compounds, metals (e.g., titanium, copper, aluminium, hafnium, lanthanum, yttrium, etc.), glasses (e.g., ferroglass), and/or any suitable substrate material. In some variants, the substrate can be coated, for example with a dielectric material (e.g., $SiO_x$, $SiN_x$, etc.). In specific examples, the emitters and/or substrate can include emitters and/or materials as disclosed in U.S. patent application Ser. No. 16/511,067 filed 15 Jul. 2019 titled "METHOD AND APPARATUS FOR A POROUS ELECTROSPRAY EMITTER" or U.S. Pat. No. 8,030,621 filed 15 Oct. 2008 titled "FOCUSED ION BEAM FIELD SOURCE," each of which is incorporated in its entirety by this reference.

The substrate surface can be smooth (e.g., surface roughness <0.5 nm), patterned (e.g., based on the emitter array, with hills and/or valleys, patterned regions of a particular surface roughness, etc.), rough (e.g., surface roughness>0.5 nm), and/or have any surface structure. In an illustrative example, the substrate can include regions with a surface roughness selected to wet a working material. For example, the surface roughness can be smaller than a predetermined value (e.g., <10 µm, <1 µm, <100 nm, smaller than the radius of curvature, smaller than the height, etc.), larger than a predetermined value (e.g., >100 pm, >1 nm, >10 nm, >100 nm, >1 µm, >10 µm, etc.), and/or have any suitable size. The surface roughness can be defined as the difference between the average surface level and a maximum surface characteristic size, the difference between a maximum surface characteristic size and a minimum surface characteristic size, difference between the average surface level and the average surface characteristic size (e.g., average over many surface characteristics, average over surface characteristic in a specific area, average over surface characteristics that are higher than the surface, etc.), arithmetic mean deviation, root mean squared, maximum valley depth, maximum peak height, skewness, kurtosis, based on the slope of the surface characteristics, and/or can otherwise be defined. In a variation of this illustrative example, the regions can be arranged or chosen to promote transportation of working material that comes in contact with the regions to predetermined portions of the emitter array or substrate such as to guard emitters, to nearby emitters, to working material containment regions (e.g., pools, substrate reservoirs, etc.), and/or to any suitable portion of the substrate.

Figure 9A:
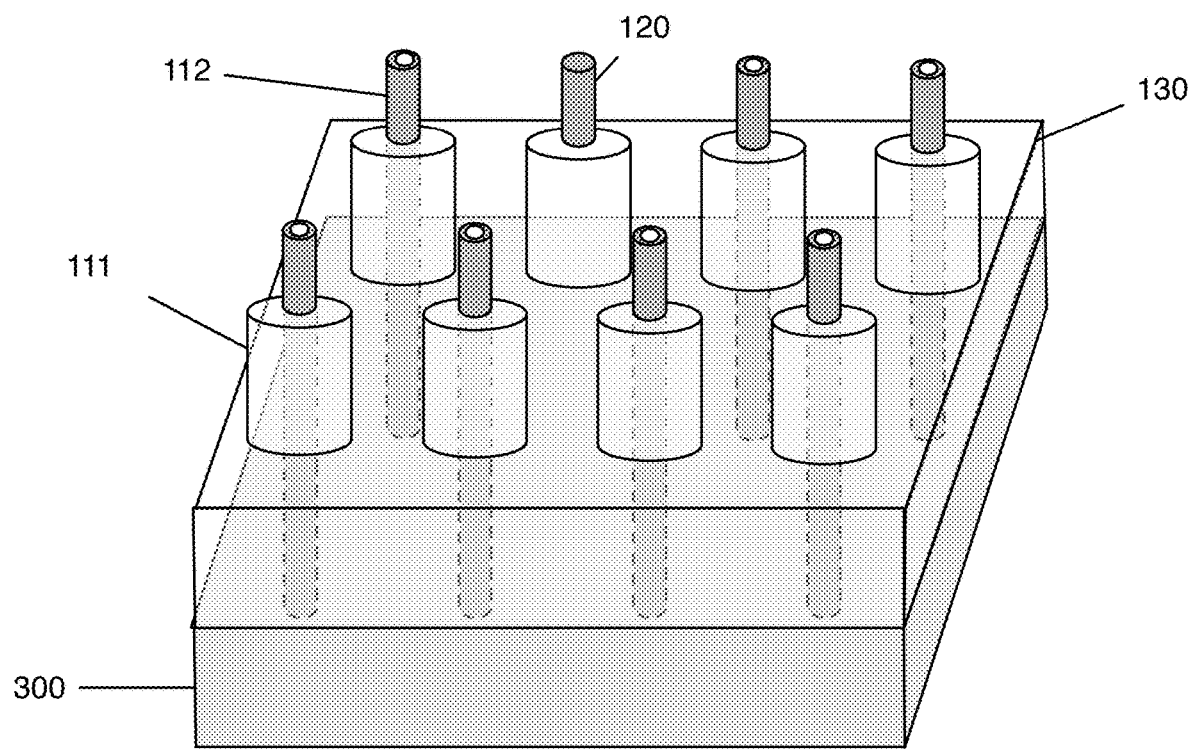
FIGS. 9A and 9B are schematic representations of examples of emitter arrays on substrates, respectively.
Figure 9B:
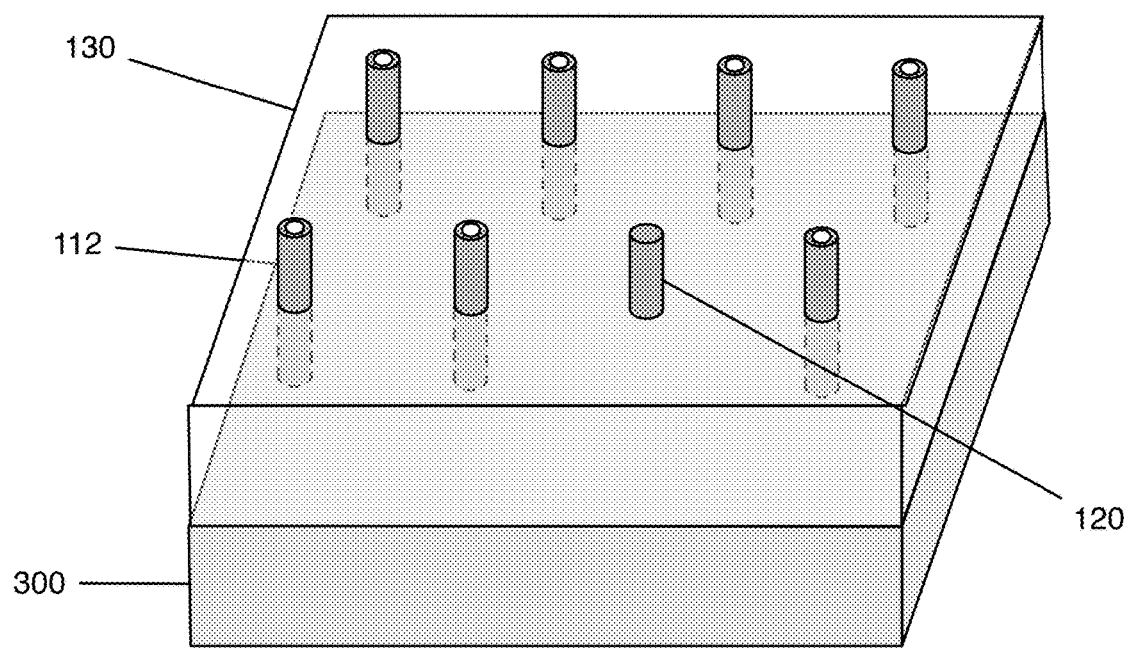

The emitter array preferably includes one or more emitters 110. In examples, the emitter array can include between 1-100,000,000 emitters (such as 1; 2; 4; 10; 20; 40; 100; 200; 400; 1,000; 2,000; 4,000; 10,000; 20,000; 40,000; 100,000; 200,000; 400,000; 1,000,000; 2,000,000; 4,000,000; 10,000, 000; 20,000,000; 40,000,000, 100,000,000; values therebetween, etc.); 100,000-1,000,000 emitters; 100-1,000 emitters; 1,000,000-10,000,000 emitters; greater than 100,000, 000 emitters; and/or any suitable number of emitters. Each emitter can be the same (e.g., same dimensions to within a tolerance such as ±1%, ±5%, ±10%, ±20%, etc.; same material; same geometry; etc.) and/or different (e.g., different dimensions, different materials, different geometry, etc.). The emitters can be overlapping (e.g., share support material, share one or more emitter walls, have overlapping projections on a common plane, etc.) or nonoverlapping (e.g., separate support material, separate emitter walls, etc.). In an illustrative example of an emitter array including different emitter geometries, as shown in FIGS. 9A and 9B, an emitter array can include a first plurality of emitters that are directly coupled to the working material (e.g., in a reservoir) and a second plurality of emitters (e.g., guard emitters) that are not directly coupled to the working material (e.g., not coupled to a reservoir, are completely filled, etc.). In this example, the guard emitters can mitigate the effects of failure due to excess fluid flow and/or liquid accumulation and spread (e.g., by acting as sites where emission can occur, by acting as externally wetted emitters, by acting as passive emitters, etc.).

The density of the emitter array (e.g., the number of emitters per unit area, the number of egress ports per unit area, distance between adjacent emitters, etc.) can depend on the potential difference (e.g., between the counter electrode and the working material, between the working material and the substrate, between the working material and the support material, etc.), the emitter quality (e.g., breakdown voltage, feature size, defect concentration, etc.), the emitter geometry (e.g., size and/or shape of each emitter, emitter height, etc.), the substrate (e.g., size, thickness, material, etc.), and/or any suitable properties. In a specific example, the density of the emitter array can be any value between 1-50,000 emitters/mm$^2$ (such as 1, 2, 4, 10, 20, 50, 100, 200, 500, 1000, 2000, 5000, 10000, 20000, 50000, and/or values therebetween emitters/mm$^2$). However, the density of the emitter array can be less than 1 emitter/mm$^2$, greater than 50,000 emitters/mm$^2$, and/or any suitable value.

Each emitter can be solid (e.g., capillary emitters) and/or porous.

The emitters within the emitter array can be arranged in a lattice (e.g., each vertex of the lattice corresponds to an emitter, each vertex of the lattice corresponds to an egress port, etc.). In specific examples, the lattice can include a hexagonal lattice, a square lattice, a rectangular lattice, a rhombic lattice, an oblique lattice, and/or any suitable lattice. However, the emitters can be arranged to tile a 2D space, irregularly spaced, randomly spaced, arranged on a curvilinear grid, and/or arranged in any suitable manner.

The emitter geometry (e.g. in three dimensions, geometrical form, etc.) can be one or more of: a right circular cone, a cylinder, a chevron (e.g., a rounded chevron), an oblique cone, an elliptic cone, a pyramid (e.g., a tetrahedron, square pyramid, oblique pyramid, right pyramid, etc.), a prismatoid, a rectangular cuboid, hemispherical, wedges, hemi-ellipsoidal, paraboloid, comb, a cantilever (e.g., a rounded cantilever, as shown for example in FIG. 20), and/or any other suitable shape. The geometry of the emitter along a longitudinal cross section (e.g., in a plane perpendicular to the emitter base, in a plane perpendicular to the substrate, etc.) can be circular, v-shaped, w-shaped, zig-zag, serpentine, polygonal (e.g., triangular), Reuleaux polygons (e.g., Reuleaux triangles), spherical polygons (e.g., spherical triangles), rounded polygons, rounded semipolygons, rectangular (e.g., with serrations or crenates along the top), semicircular, stadium-shaped, Vesica piscis, oval, semioval, hemistadium, parabolic, or have any other suitable shape. The geometry of the emitter along a transverse cross section (e.g., in a plane parallel to the emitter base, in a plane parallel to the substrate, etc.) can be circular, semicircular, oval, semioval, stadium, polygonal (e.g., triangle, square, etc.), superelliptical (e.g., squircle), linear, serpentine, or have any other suitable shape. The emitter geometry can be open (e.g., as shown for example in FIG. 14) or closed (e.g., as shown for example in FIG. 9A).

The surface(s) of each emitter that comes in contact (intentionally or unintentionally) with working material are preferably electrically insulating (e.g., dielectric). However, one or more surfaces of the emitters can be conductive, semiconductive, and/or have any suitable electrical properties. The interior of the emitter is preferably made of electrically conductive or semiconducting material, but can additionally or alternatively be made of a dielectric material. Each emitter (surface) can be made of one or more: oxide, nitride, silicate, aluminate, titanate, combinations thereof, and/or any suitable materials. In specific examples, an emitter surface can be made of or include: silicon oxide (SiO$_x$), silicon nitride (SiN$_x$), aluminum oxide (AlO$_x$), tantalum oxide (TaO$_x$), titanium oxide (TiO$_x$), strontium titanate (Sr(TiO$_3$)$_x$), zirconium oxide (ZrO$_x$), hafnium oxide (HfO$_x$), silicon oxynitride (SiO$_x$N$_y$), hafnium silicate (Hf(SiO$_4$)$_x$), lanthanum oxide (LaO$_x$), yttrium oxide (YO$_x$), lanthanum aluminate (La(AlO$_3$)$_x$), silicon, aluminum, tantalum, hafnium, and/or any suitable material and/or combination thereof. In some variants as shown for example in FIG. 10, an emitter can be made of a conductive material that is coated with a dielectric material. However, an emitter can otherwise be constructed.

In a specific example, each emitter can be made of more than one material. These materials can be alloyed, layered, stacked, adjacent to one another, and/or arranged in any suitable manner. The use of a plurality of materials for an emitter can enable one or more of the materials to be selectively removed, such as to create a taper (e.g., a sharpened tip) of the emitter. In variants, one layer can be patterned creating a ridge or other structure that can promote wetting. In related variants, the support layer can additionally or alternatively be patterned such as to undercut the ridge to increase the emitter height and/or to promote wetting. However, one or more layers can be patterned in any manner and/or the layers can be used without patterning.

The height (e.g., total height, the extent of each emitter protruding from the substrate, the extent of the emitter that is not surrounded by the substrate, the distance from an emitter tip to a substrate broad face, the distance between an egress port and the substrate, the distance between the egress port and ingress port, etc.) can be any value and/or range thereof between about 1 µm and 5 mm such as 2 µm, 5 µm, 10 µm, 20 µm, 25 µm, 50 µm, 100 µm, 150 µm, 200 µm, 500 µm, 1000 µm, 2000 µm, 5000 µm, or values therebetween. However, the height of each emitter can be less than 1 µm, greater than 5 mm, and/or any value.

Figure 3A:
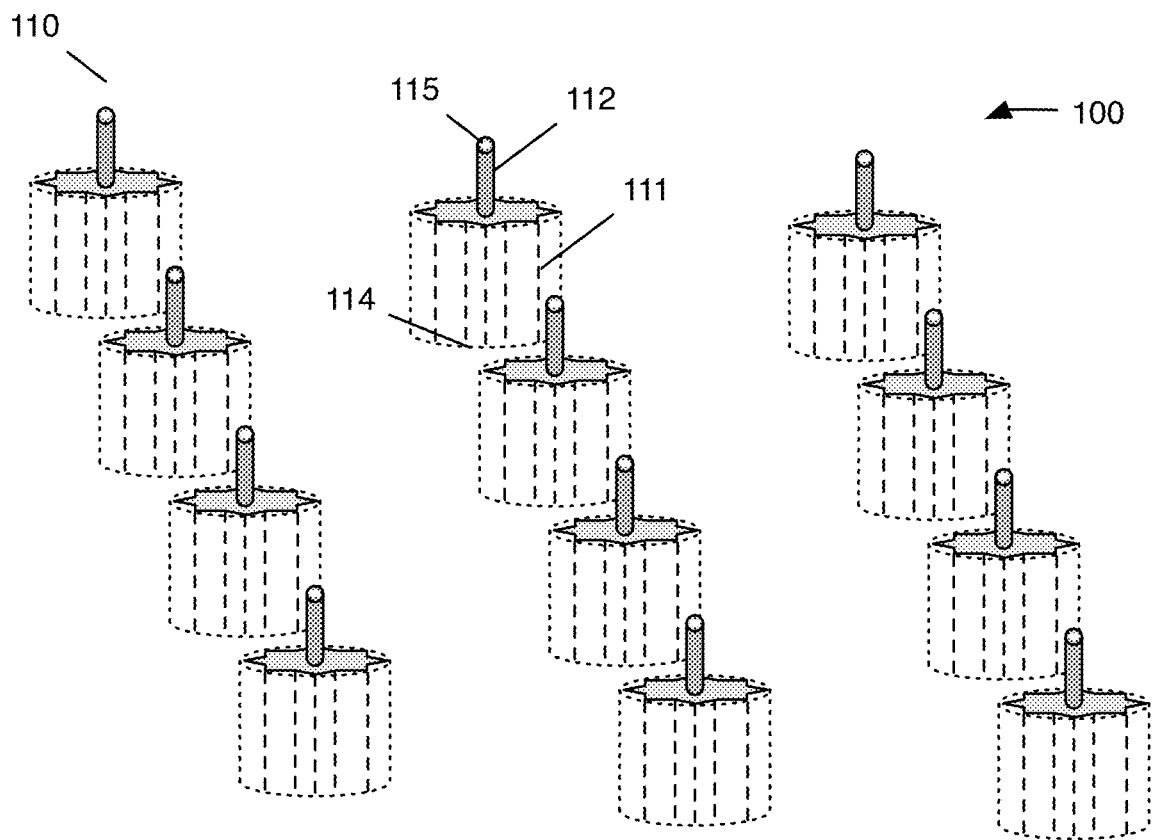
FIGS. 3A and 3B are schematic representations of examples of emitter arrays where the individual emitters can be nonoverlapping and overlapping, respectively.
Figure 3B:
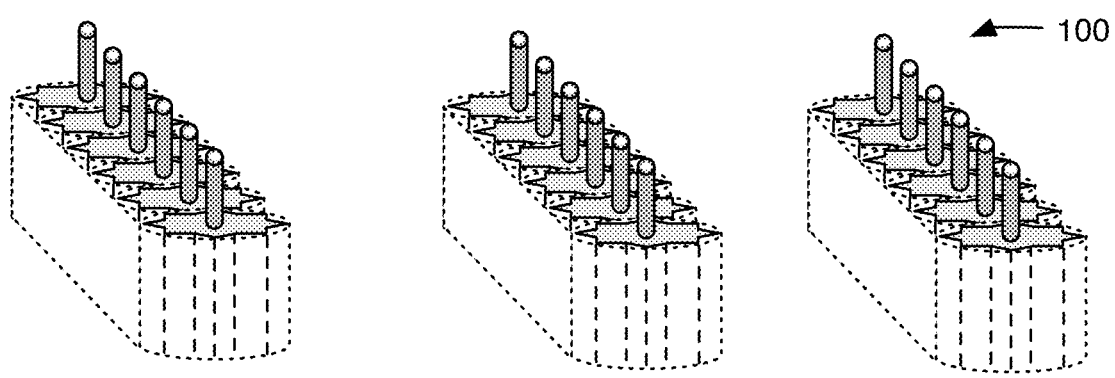
Figures 6A, 6B, 6C, 6D:
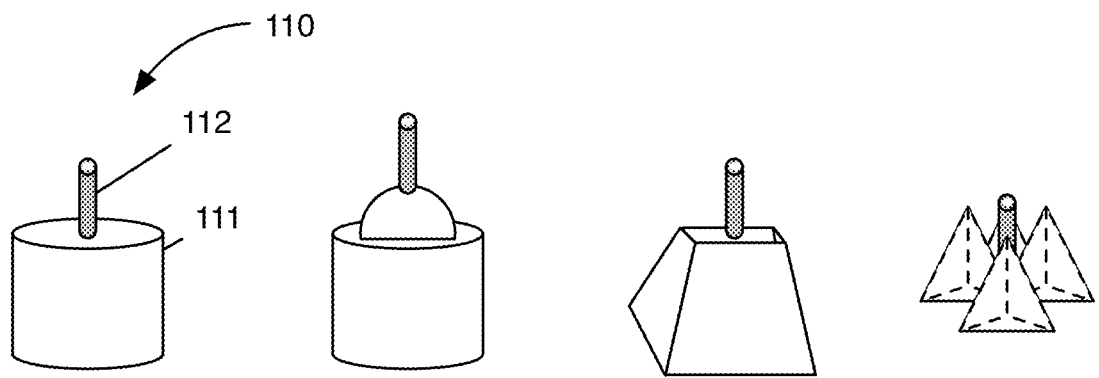
FIGS. 6A-6D are schematic representations of examples of different support material geometries.

The lateral and longitudinal extent of each emitter can be the same and/or different (e.g., within an emitter, between different emitters, etc.). The lateral and/or longitudinal extent can each be any suitable value and/or range thereof between about 10 nm and about 1 mm such as 10 nm, 20 nm, 50 nm, 100 nm, 200 nm, 500 nm, 1 µm, 2 µm, 5 µm, 10 µm, 20 µm, 50 µm, 100 µm, 150 µm, 200 µm, 500 µm, 1000 µm, or values therebetween. However, the lateral and/or longitudinal extent can be less than 10 nm, greater than 1 mm, and/or any suitable value. In some variants, one or more emitters can overlap with another emitter (and/or other suitable structure such as a guard emitter) along the lateral and/or longitudinal extent (for example as shown in FIG. 3B, sometimes referred to as a "blade emitter"). However, the emitters can be separate (example as shown in FIG. 3A) and/or arranged in any manner.

Each emitter can include one or more ingress port 114 and one or more egress port 115. However, in some variants, one or more emitters can include no ingress and/or no egress ports (e.g., guard emitters, reservoirs, etc.). The ingress port(s) preferably function to allow working material to enter the emitter (e.g., an emitter volume). The egress port preferably functions to emit working material from the emitter. The ingress and/or egress port(s) can actively (e.g., based on an applied electrical potential, based on a fluid control mechanism, etc.) and/or passively (e.g., based on structure) enable working material to enter and/or exit the emitter. Each ingress port can have the same and/or a different geometry (e.g., size and shape) relative to other ingress ports. Each egress port can have the same and/or a different geometry (e.g., size and shape) relative to other egress ports. Each ingress port can have the same and/or a different geometry (e.g., size and shape) relative to an egress port.

In one embodiment, an ingress port can define an opening that is between about 10 µm and 500 µm. An egress port can define an opening that is between about 0.1 µm and 50 µm. However, the opening defined by the ports can be any suitable size. In a specific example, the ingress port defines an opening that is larger than the egress port. However, the ingress and egress ports can define openings of the same size and/or the egress port can define an opening that is larger than the ingress port. The cross section of the ingress and/or egress port(s) can be or approximate (e.g., has an appearance similar to; goodness of fit, such as an re value, to a shape is at least 0.75, 0.8, 0.85, 0.9, 0.95, 0.97, 0.99, 0.995, 0.999, etc.; etc.) a circle, a polygon (e.g., square, rectangle, star, isotoxal, cross, irregular, regular, etc.), semi-circular, annular, an ellipse, examples as shown in FIGS. 4A-4E, shaped like a solar-symbol, a sun-shape, a roulette, a hypocycloid (e.g., with k=5.5, 6, 10, 20, any other suitable number, etc.), a keyhole shape, lachrymaform, lanceolate, a circle with a plurality of rays (e.g., oblong, elliptical, linear, angular, etc. rays) extending radially from the circle (as shown for example in FIG. 4E), and/or have any suitable combination of linear and/or curved arcs in the cross section. The cross section of the ingress port(s) preferably include one or more curved and/or angular protrusions or rays (for example as shown in FIGS. 4D and 4E). The protrusions can function to increase the wettability of the emitter to working material. However, the cross-section of the ingress port can be smooth (e.g., a regular polygon, circular, elliptical, etc.), include fins, and/or have any suitable geometry. The ingress and/or egress ports can have rounded edges, sharp edges, beveled edges, or any other suitable edge profile.

In a second embodiment, an ingress port can include an opening to a manifold in the emitter structure (as shown for example in FIGS. 14 and 15A-C).

Figures 19A, 19B, 19C, 19D:
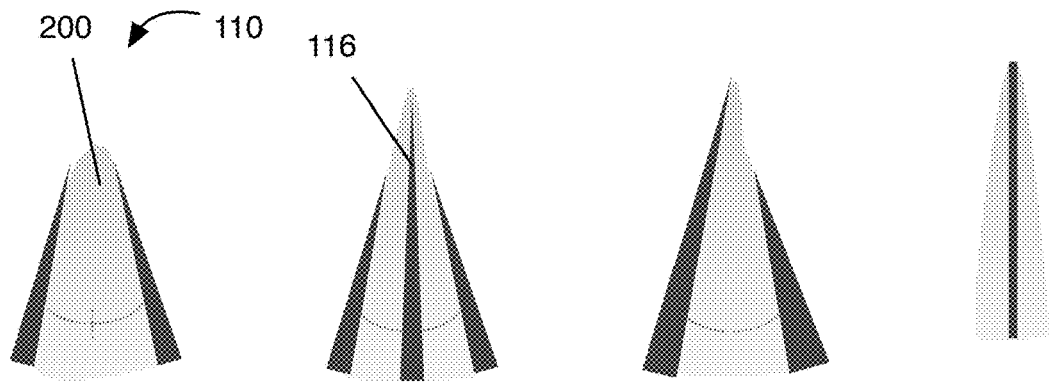
FIGS. 19A-19C are schematic representations of examples of a symmetric emitter tip, a symmetric emitter tip including a center spike, and an asymmetric emitter tip, respectively.
FIG. 19D is a schematic representation of a side view of an example emitter tip as shown in FIGS. 19A-19C.

In a third embodiment, an egress port can be or include a tip or apex of the emitter (e.g., a tip of a capillary of the emitter, as shown for example in FIG. 19D), where working material can be emitted from or near the tip. In this embodiment, the emission of working material can depend on the tip size, tip shape, tip radius of curvature, electrical potential, electric field, tip shape, and/or other properties of the system. The tip radius of curvature can be between about 10 nm and 10 µm such as 10 nm, 20 nm, 50 nm, 100 nm, 200 nm, 500 nm, 1000 nm, 2000 nm, 5 µm, 10 µm, or values therebetween. However, the tip radius of curvature can be less than 10 nm, greater than 10 µm, and/or any suitable value. In some variants, emission structures (e.g., needle-like emission structures) can be proximal to the tip to enhance or promote working material emission. The emitter tip can be symmetric (as shown for example in FIG. 19A), asymmetric (e.g., as shown for example in FIG. 19C), and/or have any suitable symmetry. The emitter tip can optionally include an emission structure such as a center spike (as shown for example in FIG. 19B), which can function to provide sharper and/or more stable working fluid emission.

Note that these embodiments are not mutually exclusive. In a first illustrative example, an emitter can include an ingress port for internal wetting of the emitter (with working material) and manifolds for external wetting of the emitter. In a second illustrative example, an emitter can include a tip and an egress port (e.g., an opening) defined in or near the tip, where working material can be emitted from the egress port and/or from the tip. However, an ingress and/or egress port can otherwise be configured.

However, the embodiments can otherwise be combined and/or the ingress and egress ports can otherwise be configured.

Figure 13A:
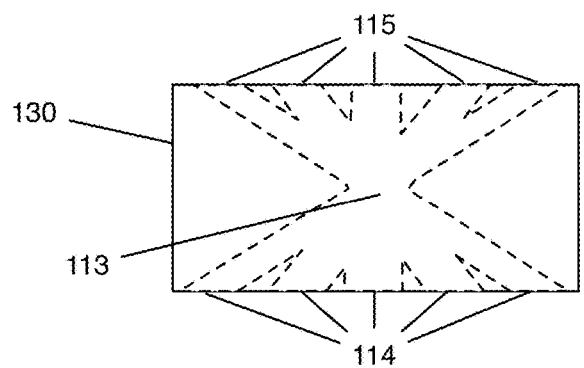
FIGS. 13A-13C are schematic representations of a side view, a top view, and a top view of examples of a plurality of egress ports coupled to a plurality of ingress ports, respectively.
Figure 13B:
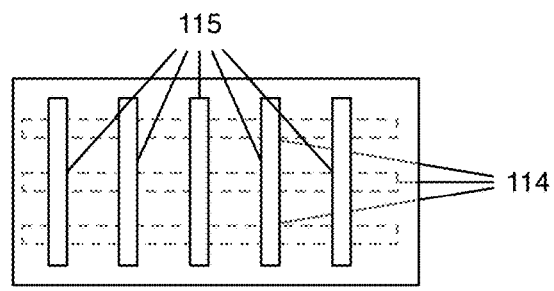
Figure 13C:
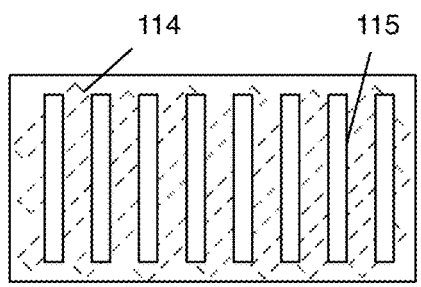

Each egress port can correspond to one or more ingress ports. Each ingress port can correspond to one or more egress ports. For instance, 1 ingress port can be coupled to 1, 2, 3, 4, 5, 10, 20, 50, 100, 1000, values therebetween or greater egress ports; and 1 egress port can be coupled to 1, 2, 3, 4, 5, 10, 20, 50, 100, 1000, values therebetween or greater ingress ports. Coupling a plurality of ingress ports to a plurality of egress ports can enable more than one fluid path between the reservoir and each egress port (e.g., emission site). In specific examples, the ingress and egress ports can be cross hatched (e.g., couple egress to ingress ports that extend along orthogonal directions), intersecting (e.g., couple egress ports to ingress ports that extend along intersecting directions), parallel (e.g., coupled egress ports to ingress ports that extend along parallel directions), random (e.g., couple random ingress ports to random egress ports), be coupled as shown for example in FIGS. 13A-13C, and/or couple any suitable ingress ports to egress ports.

Figure 8A:
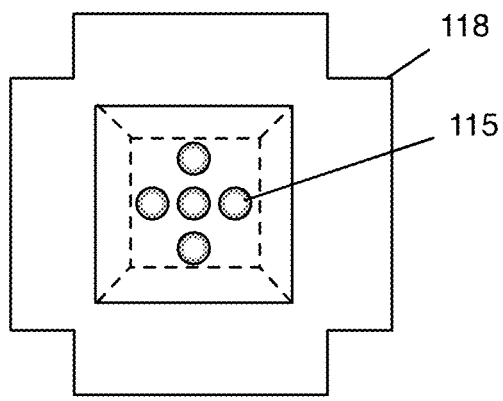
FIGS. 8A-8C are schematic top down views of examples of an emitter including more than one egress port.
Figure 8B:
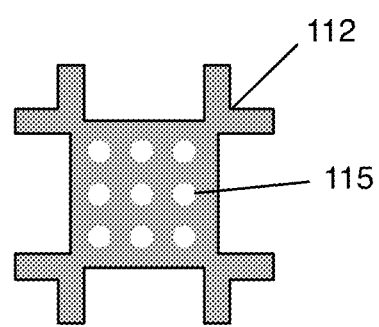
Figure 8C:
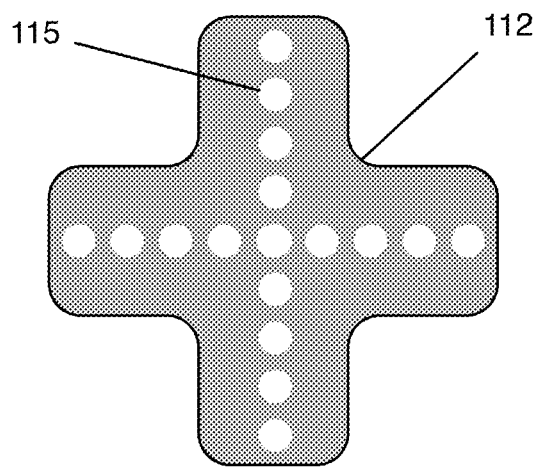

In variants including more than one ingress and/or egress port within a given emitter, the plurality of ingress and/or egress ports can be arranged in a rectilinear grid, linear grid, curvilinear grid, randomly, with uneven spacing, as shown in FIGS. 8A-8C, and/or in any orientation and/or separation distance. The plurality of ingress and/or egress ports can be separated by any distance between 0.1-10 µm such as 100 nm, 200 nm, 500 nm, 1000 nm, 2000 nm, 5 µm, 10 µm, or values therebetween. However, the plurality of ingress and/or egress ports can be separated by less than 100 nm, greater than 10 µm, and/or by any suitable distance.

The ingress and/or egress ports can optionally include a fluid control mechanism. The fluid control mechanism can control and/or modify any flow property (e.g., timing such as of the release of working material, of the intake of working material, the relative time between intake and release, etc.; amount of working material; turbulence; etc.). Examples of fluid control mechanisms can include: control systems, pumps, valves, tortuous paths, and/or any suitable fluid control mechanisms.

The emitter volume 113 preferably couples the ingress port to the egress port, promoting motion of the working material from the ingress port to the egress port. The emitter volume can be closed volume (e.g., an internal volume, such that working material in the emitter volume is isolated from an external environment proximal the emitter) and/or an open volume (e.g., a trough such that working material in the emitter volume is in contact with an external environment proximal the emitter). For example, the emitter volume can be arranged inside the emitter (e.g., concentrically, centered within the emitter, asymmetrically within the emitter, etc.), integrated in an emitter wall (e.g., inner wall, outer wall, etc.), along the outside of the emitter (e.g., an emitter trough as shown for example in FIGS. 15B and 15C), and/or can have any suitable arrangement.

In a specific example of an external or vented emitter volume, the emitter volume 113 can define a manifold 119. Working material can be fed to the emitter manifold from a substrate manifold 134 (e.g., a distributary 137 of the substrate manifold, a direct feed to the substrate manifold, etc.), by a through hole of the substrate (e.g., an internal emitter volume), and/or otherwise be fed. The manifold can refer to a trough, a walled path, a roughened surface, a channel, an internal path, and/or any suitable path along the emitter. The manifold preferably extends from a base of the emitter to the apex or tip of the emitter, but can extend along any suitable length of the emitter (e.g., starting at the base, ending at the tip, portion or portions between the base and tip, etc.). The manifold can be on an outer surface of the emitter (e.g., a broad face or surface of the emitter that is directed away from the substrate, a broad face or surface of the emitter that is directed toward the substrate, etc.) and/or an inner surface (e.g., aperture defined by inner walls of the emitter).

The fluid motion within the emitter volume is preferably symmetric (e.g., azimuthally symmetric, radially symmetric, etc.), but can be asymmetric (e.g., faster along one side and/or wall defining the emitter volume than another wall). The emitter volume can provide a straight path (e.g., manifold) between the ingress and egress ports, a tortuous path, a curved path, and/or any suitable path for working material to pass through or along the emitter.

The emitter walls 112 defining the emitter volume are preferably configured to (e.g., based on thickness, based on shape, based on surface roughness, etc.) wet working fluid. The emitter walls can additionally or alternatively be configured to (e.g., based on thickness, based on shape, based on surface roughness, etc.) enable structural robustness of a capillary (e.g., an unsupported capillary) and/or otherwise function. The emitter walls (e.g., the walls defining the emitter volume such as the inner walls of the emitter, outer walls of the emitter, an aperture defined in the inner or outer walls, etc.) can have a cross-sectional shape that matches the ingress port, egress port, or is an intermediate shape between the ingress port and egress port. However, the emitter walls cross-sectional shape can additionally or alternatively, be polygonal, circular, any suitable ingress port shape, any suitable egress port shape, and/or have any suitable shape. The emitter walls can be symmetric (e.g., rotationally symmetric, mirror symmetric, inversion symmetric, etc.) or asymmetric. The emitter walls preferably taper between the ingress and egress port. However, the emitter walls can expand, retain substantially constant size (e.g., cross-sectional area, shape, diameter, perimeter, diagonal length, etc.), can vary in size, be concave, be convex, and/or have any suitable geometric relationship. The taper angle can be any suitable angle between about 0° and about 20°. However, the taper angle can be greater than 20°, can vary along the height of the emitter, and/or be any suitable angle. The inner surface and/or outer surface of the emitter can taper, expand, and/or remain substantially the same size (e.g., diameter) along part of (e.g., localized taper) and/or the entire height (e.g., fully taper) of the emitter. For example, an outer diameter of a capillary can taper from the support member (e.g., the substrate surface) to the egress port (e.g., emitter tip), a taper can begin (or terminate) a predetermined distance from (e.g., below) the egress port (e.g., 1 µm, 5 µm, 10 µm, 50 µm, 100 µm, etc.; at a distance equal to 1%, 5%, 10%, 20%, 30%, 40%, 50%, 60%, 70%, 80%, 90%, 95%, 99%, etc. of the height of the capillary; etc), and/or can otherwise taper. However, the emitter can otherwise be tapered.

The emitter walls (e.g., capillary walls) can have any thickness (e.g., uniform thickness, maximum thickness, minimum thickness, etc.) between about 0.1-10 µm such as 100 nm, 200 nm, 500 nm, 1 µm, 2 µm, 5 µm, 10 µm, or values therebetween. However, the emitter walls can have a thickness less than 0.1 µm, greater than 10 µm, and/or any suitable thickness. The emitter walls can taper (e.g., converge), expand (e.g., diverge), remain parallel, and/or vary along the length of the emitter. For example, the emitter (e.g., outerwall of the emitter, inner wall of the emitter) can taper (e.g., converge) as it approaches the egress port. The inner surface (e.g., the emitter surface that intentionally comes in contact with working material) and/or outer surface (e.g., the emitter surface that does not intentionally come in contact with working material) of the emitter can taper and/or expand in the same (e.g., by the same taper angle) or a different manner (e.g., different taper angle). In a specific example, the outer diameter of an emitter can decrease proximal or along the egress port, while the inner diameter of the emitter can remain substantially constant. The surface of the emitter walls (e.g., inner surface, outer surface) can be smooth, ribbed, patterned, and/or can have any suitable surface texture. In variants where the emitter walls are not smooth (e.g., patterned, ribbed, etc.), the surface texture can function to enhance the wetting of the working material within the capillary. For example, the surface roughness (e.g., an arithmetic mean deviation of an assessed profile, a root mean squared distance, a maximum valley depth below a mean line, a maximum peak height about a mean line, an average peak height above a mean line, an average valley depth below a mean line, a maximum peak to peak height, an average peak to peak height, skewness, kurtosis, average distance between the highest peak and lowest valley in a profile, etc.) of the emitter walls is preferably between about 25 nm to 10 µm such as 100 nm, 200 nm, 500 nm, 1 µm, 2 µm, 5 µm, 10 µm, or values therebetween. However, the surface roughness can be less than 25 nm, greater than 10 µm, or any suitable value.

In variants, the emitter wall can include one or more emission structure 116 (e.g., protrusion), which can function as a capillary feed externally wetted emission structure (as shown for example in FIGS. 21A and 21B). The protrusion (e.g., spike) can define a protrusion egress port which can have the same or different shape as the emitter ingress or egress port. The protrusion can be made, for example, by etching a capillary with a slot perpendicular to the capillary. The slot and capillary can be coated (e.g., conformally coated such as with LPCVD or thermal oxidation) with a film that pinches closed in the slot but leaves the capillary open. The thickness of the slot fill material can be between about 1-2× the thickness of material coating the inside of the capillary (e.g., inner volume), less than 1×, or greater than 2× the thickness of the coating. The slot material can be released from the surrounding substrate and this released portion can then be etched to between the coating thickness and the thickness of to the material in the slot and/or be etched to less than the coating thickess. However the protrusion can otherwise be manufactured or shaped.

Figures 17A, 17B, 17C:
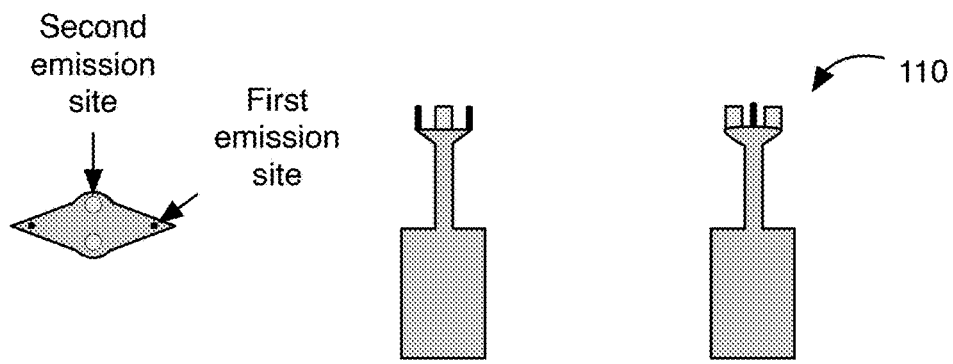
FIGS. 17A-17C are schematic representations of a top, first side, and second side view of an example emitter, respectively.

In variants of the emitter defining more than one volume, the plurality of volumes are preferably directly connected (e.g., a unitary volume). However, the plurality of volumes can be coupled by a coupling region, separate (e.g., nonintersecting volumes), and/or otherwise arranged. Each volume of the plurality of volumes can be the same (e.g., size such as inner diameter, lateral extent, longitudinal extent, etc.; shape; taper angle; wall thickness; etc.) and/or different (e.g., size such as inner diameter, lateral extent, longitudinal extent, etc.; shape; taper angle; wall thickness; etc.). In a specific example, as shown in FIGS. 2A-2D, a volume adjacent to the ingress port can have a substantially star-polygonal (e.g., sun shaped, circular with a plurality of rays extending from it, etc.) cross-section. This volume can taper to meet a second volume, where the second volume can be adjacent to or part of the egress port. The second volume can have a substantially circular cross-section (e.g., with a smaller diameter than the first volume). In this specific example, the walls defining the first volume can function as a support structure to help increase the mechanical stability of and/or decrease the likelihood of the walls defining the second volume from the breaking. In a second specific example, as shown in FIGS. 17A-17C, an emitter can include a plurality of emission sites. The emission sites can be fed by the same ingress port(s) or different ingress ports. In this specific example, the first emission site can have a smaller egress port (e.g., an inner diameter of the egress port) than the second emission site. The plurality of emitters can be symmetrically arranged (e.g., mirror symmetric, rotationally symmetric, etc.) and/or asymmetric. However, the volumes can have any suitable geometry and/or relationship.

In some variants, for example as shown in FIG. 5, the volume defined by the emitter (e.g., capillary volume) can include (e.g., be filled with) porous material 140. The porous material can function to wick working material into the volume. The porous material can partially or fully fill, line, coat, and/or be otherwise arranged inside and/or outside each emitter volume. However, the porous material can be freestanding (e.g., extend outside of the emitter), be shaped to form the emitter, and/or have any suitable structure. The porous material can include metals, ceramics, glasses, polymers, particles (e.g., porous particles, nanoparticles, mesoparticles, microparticles, solid particles, etc.), and/or any suitable material. However, the emitter(s) can be filled with any material (e.g., to provide a tortuous path through the capillary) and/or be empty (e.g., except for air, working material, vacuum, etc.). The packing density of the packing material is preferably between about 50-100% such as 75%, 80%, 90%, 95%, 99%, 99.5%, 99.9%, or values therebetween, but can be less than 50%.

One or more emitters of the emitter array preferably include a support material 111 (e.g., encapsulation material). The support material can provide mechanical support for the capillary and/or protection from potentially- and otherwise-damaging events (e.g., electrical discharge, chemical attack, radiation, etc.). The support material can be electrically conductive, semiconductive, insulating, and/or have any suitable electrical properties. In variants where the support material is electrically conductive or semiconductive, the support material can additionally or alternatively function to promote wetting of the working material within the capillary (ies) (e.g., via electrowetting, electrostatic attraction, electro-osmotic flow, etc.). As shown for example in FIGS. 9A and 9B, the support material can be the same and/or different from the substrate. The same support material can be used for each emitter, the same support material can be used for a subset of the emitters, and/or each emitter can have separate support material.

The support material preferably surrounds the emitter (e.g., is in contact with the outer wall of the capillary). However, the support material can partially surround, abut, be integrated into, be arranged inside, and/or have any arrangement relative to the emitter. The support material can extend along any suitable fraction of the height of the emitter between 5% to 200% (e.g., 10%, 25%, 33%, 50%, 67%, 75%, 100%, 125%, 150%, 200%, etc.). However, the support material can be any suitable height. The support material can taper (e.g., along the capillary length, such as from the base of the capillary to the tip; along the capillary width; etc.). However, the support material can expand, retain substantially constant size (e.g., cross-sectional area, shape, diameter, perimeter, diagonal length, etc.), can vary in size, be concave, be convex, and/or have any suitable geometric relationship along any suitable dimension.

The lateral and/or longitudinal extent of the support material preferably matches the height of the emitter (e.g., wherein the height of the emitter extends outside of or above the support material). However, the lateral and/or longitudinal extent of the support material can be independent of the height of the emitter, can be greater than the height of the emitter, can be less than the height of the emitter, match the lateral and/or longitudinal extent of the emitter, match the substrate lateral and/or longitudinal extent, match the substrate thickness, and/or can be otherwise related to the emitter and/or substrate. For example, the lateral and/or longitudinal extent of the support material can be between 1 µm and 10 mm such as 1 µm, 2 µm, 5 µm, 10 µm, 20 µm, 50 µm, 100 µm, 200 µm, 500 µm, 1 mm, 2 mm, 5 mm, 10 mm, or values therebetween. However, the lateral and/or longitudinal extent of the support material can be less than 1 µm, greater than 10 mm, and/or any suitable value.

The support material can be isotropic and/or anisotropic. In a series of examples, the support material can include one or more: buttress, brace, stays, walls, and/or any suitable structural features. In a series of examples, the three-dimensional shape of the support material can: match the shape of the capillary (ies), be cylindrical, by pyramidal, be conical, be prismatic, be as shown for example in FIGS. 6A-6D, and/or have any suitable shape.

In some variants, the outer surface of the substrate and/or support material (e.g., the surface that can contact working material) can be electrically insulating (e.g., include an insulating coating, include a dielectric coating, be made of an insulating material, etc.). The electrical insulation can function to prevent wear (e.g., caused by electrochemical reactions) and/or damage caused by working material contacting the surfaces. In a specific example, the outer surface can include an oxide or nitride coating (such as silicon oxide or silicon nitride). However, any suitable dielectric coating can be used. In this example, the oxide coating can have any quality (e.g., good quality such as thickness greater than 10 nm, no pinholes, breakdown voltage≥2000 V, breakdown voltage≥20 V, etc.; bad quality such as thickness less than about 10 nm, one or more pinholes, breakdown voltage≤20 V, etc; etc.). However, the outer surface can be maintained at a voltage matching the working material voltage and/or have any suitable properties.

The support material can optionally include one or more anchor (e.g., structures perpendicular to a layer of the emitter and/or substrate), which can function to provide mechanical support to the emitter. Anchors can be circular, square, oval, or horseshoe, asymmetric, and/or have any suitable geometry.

In an illustrative example, an emitter can include a capillary (e.g., a cylindrical structure possessing a through hole) extending from a support material (e.g., a cylindrical structure), where the emitter volume can define an internal manifold that extends through the support material and the capillary. The height of the capillary (e.g., above the support material) is preferably approximately the same as the support material diameter. However, the height of the capillary can be larger or smaller than the support material diameter. In a second illustrative example, an emitter can include a chevron shape, where the chevron shape can include emitter channels (e.g., in the side walls, internal channels, on a face of the emitter, etc.) configured to transport (e.g., wick) working material from a substrate manifold to a tip of the emitter. The emitter channels can be arranged along: the top surface, bottom surface, side surface (e.g., vertical side), within the emitter interior, and/or another side of the emitter. However, an emitter can otherwise be arranged.

The support material, emitter, capillary, and/or other components of the emitter array can cooperatively form a unified or unitary structure, can form separate and distinct portions (e.g., contacting one another) of an emitter structure, and/or can otherwise be related.

Figure 16A:
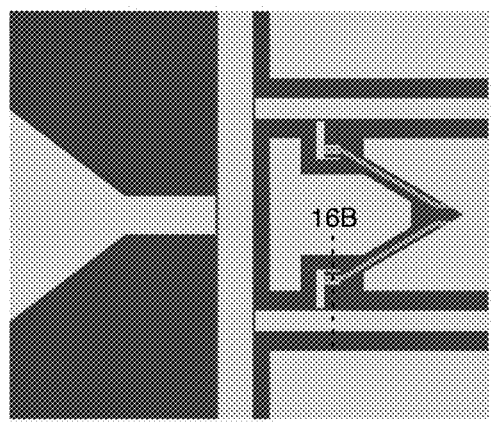
FIGS. 16A and 16B are schematic representations of a top view and a side view of an examplary emitter on a substrate.
Figure 16B:
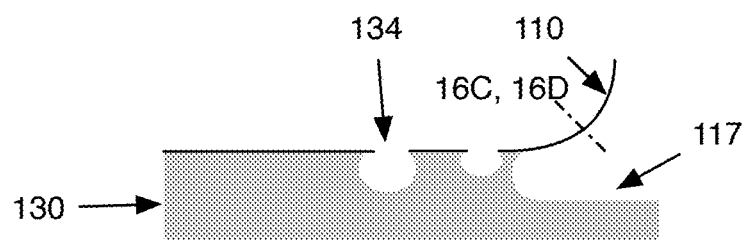
Figure 16C:
FIGS. 16C and 16D are schematic representations of cross sections of a side wall (e.g., an arm) of an examplary emitter such as in FIG. 16B.
Figure 16D:

In variants, an emitter can include an axial curl (e.g., proximal a base of the emitter, proximal a tip, along a height of the emitter, as shown for example in FIGS. 16C and 16D, etc.) which can help to promote wetting of the emitter with working material.

The emitter array preferably includes one or more guard emitters 120. The guard emitters are preferably arranged on a periphery of the emitter array, but can additionally or alternatively be randomly dispersed, arranged at predetermined locations within the emitter array (e.g., where an emitter is predicted to fail), be located on a guard emitter grid, and/or otherwise be located relative to the emitter array. As shown for example in FIGS. 9A and 9B, a guard emitter preferably has substantially the same structure as other emitters, but without the ingress and egress ports (e.g,. without defining an emitter volume). However, the guard emitter can have any emitter structure and/or any suitable structure. In some variations, the guard emitter can be configured to be externally wetted by working material, where the guard emitter can then emit the working material. For instance the guard emitter can include a surface roughness, a chemical potential, structural factors (e.g., channels or manifolds), and/or otherwise be configured to wet working material.

The guard emitter preferably includes electrically conductive or semiconducting material, but can be electrically insulating and/or have any suitable electrical conductivity. The surface(s) of the guard emitter (e.g., surfaces that can contact working material) are preferably dielectric, but can be electrically conductive, semiconducting, or have any suitable electrical conductivity.

One or more emitters of the emitter array can optionally include one or more emission structure(s) 116. The emission structure can function to emit working material and/or modify (e.g., enhance) the working material emission properties (e.g., electric field, voltage, flow rate, pressure, volume, turbulence, mode of emission, etc.). The emission structures can transport working material through their interior (e.g., an internal channel, porous network, etc.) and/or over or along their exterior. The emission structures are preferably adjacent to the egress port. However, the emission structures can be within the capillary, adjacent to the ingress port, within the manifold, be along the manifold, in a side wall of the emitter, and/or otherwise be arranged. The emission structure(s) can be electrically conducting, semiconducting, insulating (e.g., dielectric), and/or have any electrical properties. The height of the emission structure is preferably at most coincident with the height of the egress port (e.g., the distance between the substrate and the egress port is greater than or equal to the distance between the substrate and the furthest point on the emission structure). However, the emission structure can be taller than the egress port outlet, be shorter than the egress port outlet, and/or can have any suitable height.

Figure 2A:
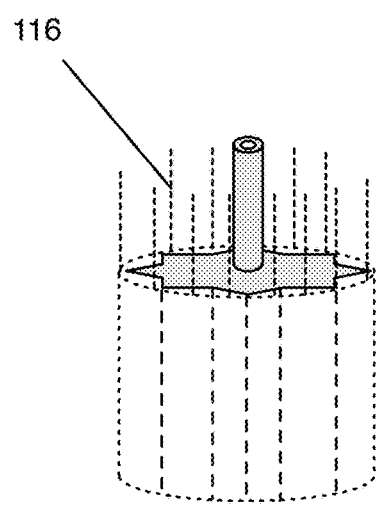
FIGS. 2A-2D are schematic representations of examples of an emitter geometry from a perspective view, a top-down view, a cross-sectional view, and an external perspective view respectively.
Figure 2B:
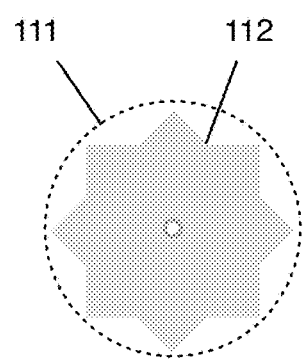
Figure 2C:
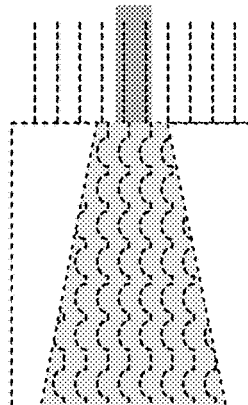
Figure 2D:
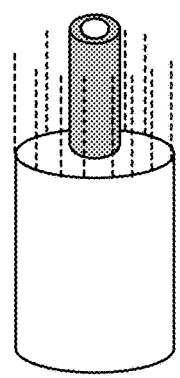

In a first specific example, as shown in FIG. 2A, the emission structure can include a set of emission needles (e.g., a needle-like emission structure). Each emission needle can be the same or a different height. The emission needles can be arranged symmetrically (e.g., rotationally symmetric, mirror symmetry, inversion symmetry, etc.) or asymmetrically relative to the egress port. The emission needles can be the same and/or different distance from the egress port. Each emission needle can have a cone, tube, rod, pyramid, wire, and/or any suitable shape.

Figure 7:
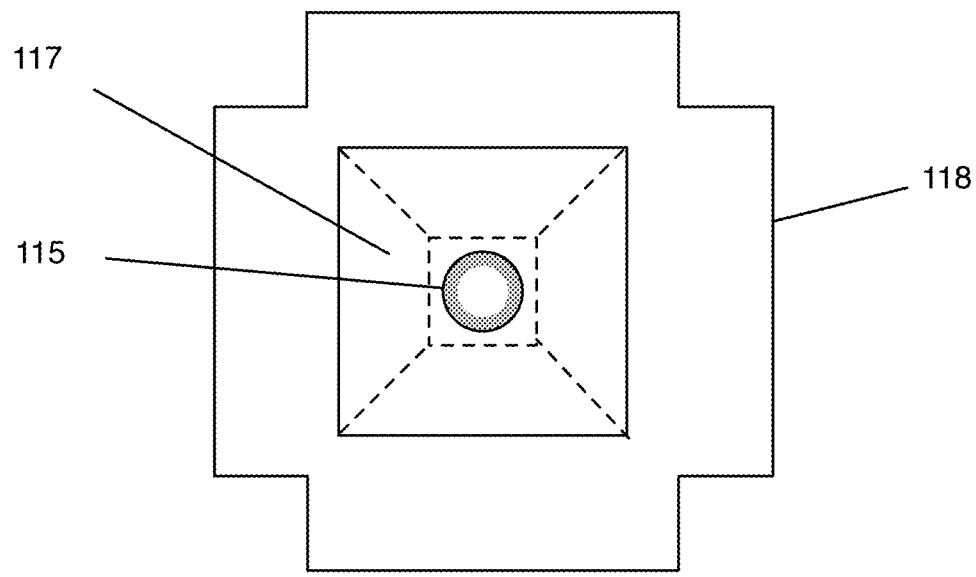
FIG. 7 is a schematic top down view of an example of an egress port including an emission structure.

In a second specific example, the emission structure can include a conductive structure 118 (e.g., a secondary electrode, guard electrode, counter electrode, distal electrode, etc.). The conductive structure can be configured to have a voltage difference relative to the working material, the counter electrode, the distal electrode, a guard electrode, and/or other suitable component. In this example, the conductive structure can be a plate (e.g., circular, planar, rectangular, polygonal, as shown in FIGS. 7 and 8A), wire, coil, and/or have any suitable structure. The conductive structure can be concave, convex, planar, and/or have any suitable curvature.

However, the emission structure can be arranged or configured in any suitable manner.

One or more emitters of the emitter array can optionally include a collection structure 117. The collection structure can define a collection volume for working material to be collected (e.g., that did not pass through the counter electrode). The collection structure can be the same or different from the emission structure (e.g., as shown in FIG. 8A). However, the collection volume can be defined by the support material, by the substrate (e.g., as shown in FIG. 16B), and/or by any suitable structure. When filled (e.g., with working material), the collection volume preferably does not occlude the egress port. However, when filled, the collection volume can occlude the egress port. Working material within the collection structure can be: transported to the reservoir, transported to an emission site of an emitter, stored, removed (e.g., degraded through an electrochemical or other chemical reaction), and/or can otherwise be used.

In variants including a working material 200 (e.g., propellant), the working material preferably contains and/or can be ionized into separate ions (e.g., cations, anions, etc.) that can be emitted. The working material is preferably stored in a reservoir and coupled to the emitter system. However, the working material can be stored in a collection volume, and/or otherwise be stored. The working material preferably does not react with or damage the emitter array. For example, the surfaces of the emitter array that contact the working material (intentionally or incidentally) can include a dielectric material that is not reactive toward the working material. Alternatively or additionally, the working material can react (e.g., undergo a chemical transformation, induce a physical transformation, deform, etc.) with the emitter array at specific temperatures (e.g., >275 K, >500 K, >1000 K, >2000 K, etc.), react with the emitter array at specific differential voltages (e.g., potential difference>0.2V, >0.5V, >0.75 V, >1 V, >1.5V, >2 V, >5V, etc.), can not react with the emitter system in conditions found in the space environment (e.g., low pressure, etc.), reacts with the emitter system slowly, reacts with the emitter system, and or can have any other suitable interaction with the emitter system.

The working material is preferably a conductive liquid. However, the working material can be a room temperature solid (e.g., metals such as bismuth, indium, etc.; iodine; salts; room temperature ionic solids that can be liquified; etc.), liquid metals (e.g., mercury), gases (e.g., xenon, argon, etc.), monopropellant (e.g., hydroxylammonium nitrate (HAN), ammonium dinitramide (ADN), hydrazinium nitroformate (HNF), etc.), mixtures (e.g., alloys, solutions such as electrolyte solutions, combinations of the above, etc.), and/or any other suitable material.

In variants, the conductive liquid can include one or more ionic liquids (e.g., an ionic compound such as an anion bound to a cation that is liquid at T<100° C.). The ionic liquid can be organic or inorganic salts that exist in a liquid state at room temperature and pressure, and can include asymmetric or symmetric bulky organic or inorganic cations and/or bulky organic or inorganic anions, charged polymers, or have any other suitable composition. The ionic liquid can be: a long chain ionic liquid (e.g., ions with long aliphatic side chains such as those containing at least six carbon atoms), a short chain ionic liquid (e.g., ions with short aliphatic side chains such as those containing at most six carbon atoms), branched chain ionic liquid, a mixture thereof, or be any other suitable ionic liquid. In specific examples, the ionic liquid can include: EMI-BF4 (1-ethyl-3-methylimidazolium tetrafluoroborate); EMI-IM (1-ethyl-3-methylimidazolium bis(trifluoromethylsulfonyl)imide); EMI-BTI (1-ethyl-3-methylimidazolium bis(pentafluoroethyl) sulfonylimide); EMI-TMS (1-ethyl-3-methylimidazolium trifluoromethanesulfonate); EMI-GaCl$_4$ (1-ethyl-3-methylimidazolium tetrachlorogallate); BMP-BTI (1-butyl-1-methylpyrrolidinium bis(trifluoromethylsulfonyl)imide); HMI-HFP (1-hexyl-3-methylimidazolium hexafluorophosphate); EMIF·2.3HF (1-ethyl-3-methylimidazolium fluorohydrogenate); EMI-CF3BF3 (1-ethyl-3-methylimidazolium trifluoromethyltrifluoroborate); EMI-N(CN)$_2$ (1-ethyl-3-methylimidazolium dicyanamide), EMI-PF6 (1-ethyl-3-methylimidazolium hexafluorophosphate); EMI-C(CN)$_3$ (1-ethyl-3-methylimidazolium tricyanomethanide); BMI-FeBr$_4$ (1-butyl-3-methylimidazolium iron tetrabromide); BMI-FeCl$_4$ (1-butyl-3-methylimidazolium iron tetrachloride); C$_6$MI-FeBr$_4$ (1-hexyl-3-methylimidazolium iron tetrabromide); C$_6$MI-FeCl$_4$ (1-hexyl-3-methylimidazolium iron tetrachloride); EMI-DCA (1-ethyl-3-methylimidazolium dicyanamide); BMI-I (1-butyl-3-methylimidazolium iodide); C$_5$MI-(C$_2$F$_5$)$_3$PF$_3$ (1-methyl-3-pentylimidazolium tris(pentafluoroethyl)trifluorophosphate); MOI-TFB (11-ethyl-3-octylimidazolium tetrafluoroborate); any ionic liquid containing an imidazolium, N-alkyl-pyridinium, tetraalkyl-ammonium, tetraalkyl-phosphonium, and/or other suitable cations; any ionic liquid containing hexafluorophosphate, tetrafluoroborate, acetate, trifluoroacetate, bromine, chlorine, iodine, nitrate, trifluorosulfonate, bis(trifluoromethylsulfonyl)imide, tetraalkylborate, heptachlorodialuminate, and/or any other suitable anion; combinations thereof; and/or any other suitable ionic liquid.

In variants including one or more reservoirs, the reservoir 300 preferably functions to store working material. The reservoir is preferably coupled to one or more emitter arrays (e.g., directly, through the substrate, through manifolds, through absorption, through adsorption, etc.). However, the reservoir can be part of the substrate, and/or can be suitably arranged. The reservoir material can be any suitable emitter material, substrate material, combination thereof, and/or any suitable material. The reservoir material can be the same as or different from the emitter material. In variants including more than one reservoir, the separate reservoirs can store the same working materials (e.g., provide redundancy) and/or store different working materials.

In variants including a control system 400, the control system functions to control the operation of the emitter system (e.g., operate fluid flow mechanisms, control the voltage of one or more components, control the temperature of the working material, etc.). The control system can be coupled to the reservoir and the emitter array. However, the control system can be coupled to any suitable components. The control system is preferably local (e.g., connected to the emitter system, connected to the reservoir, etc.). However, the control system can be remote (e.g., in communication with the emitter array, in communication with the reservoir, etc.), can be distributed (e.g., have local and remote components), and/or be otherwise suitably located. In a specific example, the control system can be a microprocessor programmed to automatically control emitter system operation. However, the microprocessor can be programmed to act in response to an operator input, to request operator input based on the emitter system operation, and/or be programmed in any suitable manner. In another specific example, the control system can be a remote operator device (e.g., smart phone, computer, etc.) in communication with the emitter system. The control system can actively (e.g., in response to a feedback loop, in response to sensor readings, in response to controls, etc.) and/or passively control the system.

The control system can control a single emitter array, a subset of emitters within an emitter array, a single emitter, a set of emitter arrays, a single reservoir, more than one reservoir, and/or any other suitable components. In variants including more than one control system, the multiple control systems can each control an overlapping set of emitters, a nonoverlapping set of emitters, the same set of emitters, the same reservoir, different reservoirs, different sets of reservoirs, and/or any other suitable division of control.

The control system can include one or more sensors 460 to monitor the operation parameters (e.g., temperature of operation, pressure of operation, working material stream properties, working material flow rate, working material flow quantities, electric field, voltage, voltage difference, current, fraction of operable emitters, etc.). In a series of examples, the sensors can include: liquid level sensors (e.g., bobs, displacement sensors, etc.), temperature sensors (e.g., thermocouples, thermometers, IR sensors, etc.), pressure sensor (e.g., liquid pressure sensors), voltmeter, ammeter, multimeter, electric field sensors, and/or any suitable sensors.

In variants, the control system can include and/or be electrically coupled to one or more distal electrodes 440, which functions to apply (e.g., cooperatively with the counter electrode) an electric field to the working material. The distal electrode can be a wall of the reservoir, patterned onto a wall of the reservoir, suspended within the reservoir, part of the substrate (e.g., a surface of the substrate distal the emitter array, a surface of the substrate proximal the emitter array, within a manifold of the substrate, etc.), part of the emitters and/or emitter array, and/or otherwise arranged. For example, the distal electrode can be arranged within a manifold of the substrate (e.g., by including a conductive material such as silicon black or a carbon xerogel in the manifold). The distal electrode preferably has a large surface area (e.g., a specific surface area that is at least $100\ m^2\ cm^{-3}$, $200\ m^2\ cm^{-3}$, $300\ m^2\ cm^{-3}$, $400\ m^2\ cm^{-3}$, $500\ m^2\ cm^{-3}$, $600\ m^2\ cm^{-3}$, $650\ m^2\ cm^{-3}$, $700\ m^2\ cm^{-3}$, $800\ m^2\ cm^{-3}$, $900\ m^2\ cm^{-3}$, $1000\ m^2\ cm^{-3}$, values therebetween, $>1000\ m^2\ cm^{-3}$, etc.; at least $100\ m^2\ g^{-1}$, $200\ m^2\ g^{-1}$, $300\ m^2\ g^{-1}$, $400\ m^2\ g^{-1}$, $500\ m^2\ g^{-1}$, $600\ m^2\ g^{-1}$, $650\ m^2\ g^{-1}$, $700\ m^2\ g^{-1}$, $800\ m^2\ g^{-1}$, $900\ m^2\ g^{-1}$, $1000\ m^2\ g^{-1}$, values therebetween, $>1000\ m^2\ g^{-1}$, etc.; etc.), which can help decrease the likelihood of an electrochemical reaction at the distal electrode. However, the distal electrode can have a low surface area (e.g., less than $100\ m^2\ cm^{-3}$, less than $100\ m^2\ g^{-1}$, etc.; for instance when a high volume or higher mass electrode is used) and/or any suitable surface area.

The distal electrode is preferably electrically contacted to a power supply, but can be electrically contacted to the emitter array, the substrate, and/or any element(s). The distal electrode is preferably held at the electrical potential generated by the power supply, but can be held at a reference potential, grounded, and/or held at any electrical potential. When the distal electrode is at a potential, the working material is preferably also at the same potential. However, the working material can be at a lower electrical potential, a higher electrical potential, and/or experience any suitable electrical potential.

The optional power supply 420 preferably functions to generate one or more electric signals (e.g., electric potentials, current, etc.). The electric signal(s) are preferably direct current, but can be alternating current, pulsating current, variable current, transient currents, and/or any current. The power supply can be in electrical communication with the emitter array, the substrate, the working material, the reservoir, the distal electrode, the counter electrode, an external system (e.g., satellite such as small satellites, microsatellites, nanosatellites, picosatellites, femto satellites, CubeSats, etc.), an electrical reference (e.g., an electrical ground), and/or any suitable component. The power supply preferably generates large electric potentials such as at least 500V, 1 kV, 1.5 kV, 2 kV, 3 kV, 4 kV, 5 kV, 10 kV, 20 kV, 50 kV. However, the power supply can generate electric potentials less than 500 V and/or any suitable electric potential. The electric potentials can depend on the working material, the emitter material, emitter separation distance, emitter geometry, emitter parameters, emitter array properties, and/or any suitable properties. The power supply is preferably able to output either polarity electric potential (e.g., positive polarity, negative polarity), but can output a single polarity. For example, the power supply can simultaneously (e.g., concurrently), contemporaneously (e.g., within a predetermined time such as 1 ns, 10 ns, 100 ns, 1 μs, 10 μs, 100 μs, 1 ms, 10 ms, 100 ms, 1 s, 10 s, 1 ns-10 μs, 1 μs-100 μs, 100 μs-10 ms, 1 ms-1 s, etc.), serially, or otherwise output a first (polarity) electric potential (e.g., to working material associated with a first subset of emitters, to working material associated with a first subset of emitter arrays, to a first distal electrode, to a first reservoir, etc.) and a second (polarity) electric potential (e.g., to working material associated with a second subset of emitters, to working material associated with a second subset of emitter arrays, to a second distal electrode, to a second reservoir, etc.). However, the power supply can switch polarity, the thruster chip can include more than one power supply (e.g., one power supply associated with each emitter array, two or more power supplies associated with each emitter array, one power supply associated with each subset of emitter arrays, etc.) and/or the power supply(s) can be otherwise arranged.

In a specific example, the power supply can be the same as any power supply as described in U.S. patent application Ser. No. 17/066,429 titled "SYSTEM AND METHOD FOR POWER CONVERSION" filed 8 Oct. 2020, which is incorporated herein in its entirety by this reference. However, any power supply can be used.

In an illustrative example, a first set of emitters (or emitter arrays) can be coupled to working material maintained at a first electric potential (e.g., a first electric polarity) and a second set of emitters (or emitter arrays) can be coupled to working material maintained at a second electric potential (e.g., a second electric polarity; such as approximately the same in magnitude but opposite in electric polarity to the first electric potential). In this example, the first and second electric polarity can be changed (e.g., switched) and/or can be fixed.

In a specific example, the control system can be used to hold the working material at a predetermined potential. The predetermined potential is preferably based on the counter and distal electrode potentials, but can be a fixed value and/or determined in any suitable manner. In this example, holding the working material at a given electrical potential can function to remove (e.g., by dissolving) emitter defects (e.g., conductive defects such as substrate material, support material, etc. that is on or in the capillaries). In a variant of this example, the control system can hold the support material and/or substrate (e.g., conductive encapsulation, silicon encapsulation) at the predetermined potential. In this variant, a predetermined support material potential can be applied to the support material after applying the working material potential to the working material (e.g., after a predetermined delay) to promote electrowetting of the emitter. The delay can be: actively controlled by the control system, induced by circuit elements (e.g., passive circuit elements, such as diodes, wiring length, capacitors, etc.; active circuit elements; etc.), or otherwise induced. The delay can be 1-100 microseconds, millisecond, seconds, minutes, or on another timescale. The support material is preferably held at the same predetermined potential (e.g., to promote working material wetting the emitter, to mitigate the risk of electrochemical reaction) as the working material, but the support material can be held at any suitable potential. The emitter (e.g., support material, capillary, substrate, etc.) is preferably held at an electrical potential with a time delay (e.g., 1 µs, 5 µs, 10 µs, 50 µs, 100 µs, 500 µs, 1 ms, 5 ms, 10 ms, 20 ms, 30 ms, 50 ms, 100 ms, 250 ms, 500 ms, 1 s, 10 s, 30 s, 60 s, values therebetween, etc.) relative to the working material (e.g., after or before the electrical potential is applied to the working material). The electrical potential can be applied to the emitter before or after applying the electric potential to the working material. The operation of (e.g., emission of working material) the emitters (and/or other components of the system including an external system) is preferably symmetric (particularly but not exclusively with respect to the applied potential), but can be asymmetric. The time delay can be actively (e.g., based on a control system such as using a feedback loop) and/or passively (e.g., based on circuit size, using passive electronics such as diodes) controlled. In some variants, the time delay can depend on a characteristic time (e.g., a relaxation time) of or associated with the working material. The time delay is preferably greater than the characteristic time, which can function to allow time for the working material to mechanically respond to the electrical potential. However, the time delay can be less than or equal to the characteristic time. However, the support material and working material can be held at an electrical potential at the same time. However, the control system can control the emitter system in any suitable manner.

In a second specific example, the control system can control the flow of the working material. For instance, the control system can operate a flow control mechanism (e.g., pump, valve, etc.) of the ingress port, egress port, and/or reservoir. In a variant of this example, the control system can control the flow based on the voltage (e.g., counter electrode voltage, distal electrode voltage, support material voltage, working material voltage, etc.). For instance, the working material emission can be controlled to have a first set of flow properties (e.g., volume, emission structure, etc.) associated with a low operating voltage and a second set of flow properties associated with a high operating voltage. However, the flow of the working material can be controlled in any suitable manner.

In a third specific example, the control system can include one or more flyback diodes connected in parallel with the working material fluid path. The flyback diodes can ensure that any voltage greater than the diode turn on voltage is shunted around the working material.

However, the control system can be used for any emitter array (e.g., capillary emitters, non capillary emitters, porous emitters, etc.).

However, the control system can control any suitable properties of the apparatus.

The emitter array(s) and/or emitters are preferably manufactured by processing a substrate (e.g., a wafer of substrate material). However, the emitter arrays can be grown (e.g., on a substrate), and/or manufactured in any suitable manner. The entire substrate and/or any suitable portion of the substrate can be processed at the same time. The wafers can have any size between 25 mm to 450 mm, but the wafer can be any size. Each of the emitters is preferably manufactured simultaneously (e.g., in parallel). However, one or more of the emitters can be manufactured in sequence (e.g., in series). Processing the substrate can include one or more of: etching (e.g., into the wafer; selective etching such as along specific crystal planes, etching specific materials, etc.; etc.), depositing material, growing material, patterning the substrate (e.g., using lithographic techniques, machining the substrate, etc.), drilling or ablating (e.g., using a laser, electrochemistry, mechanical, etc.), implanting ions (e.g., local ion implantation), driving chemical reactions (e.g., electrochemistry, reduction, oxidation, etc.), using surface manufacturing methods, using depth manufacturing methods, and/or any suitable steps.

In some variants, the manufacturing process can include selectively removing one or more materials from one or more emitters. Selectively removing material can function to modify the shape of the emitters (e.g., create a taper, decrease a wall thickness, sharpen the emitter, etc.). Selectively removing one or more materials can include ablating the material (e.g., laser ablation), chemical etching, polishing, reactive ion etching, and/or any suitable material removal process. Selectively removing one or more materials can remove a monolayer, sub-monolayer, multiple layers, any suitable thickness of material between 1 nm and 10 µm such as 1 nm, 2 nm, 5 nm, 10 nm, 20 nm, 50 nm, 100 nm, 200 nm, 500 nm, 1 µm, 2 µm, 5 µm, 10 µm, values therebetween; less than 1 nm of material; more than 10 µm of material; and/or any suitable amount of material. The material can be selectively removed symmetrically or asymmetrically (e.g., about a reference axis such as a working material flow axis, an axis normal to the egress port, an axis normal to the ingress port, an axis normal to the substrate, an axis parallel to the egress port, an axis parallel to the ingress port, an axis parallel to the substrate, etc.). In a specific example, when the emitter includes an oxide, the oxide can be removed from one or more emitters. For example, a 12 µm outer diameter egress port can have oxide removed to decrease the egress port outer diameter to 10 µm. In this specific example, removing material adjacent to the egress port can function to decrease the size of the working material as it is emitted from the emitter, reduce the firing voltage, increase the sharpness of the tip, and/or increase the stability of the working material emission. However, any suitable material (e.g., amount, type, shape, location, etc.) can be removed.

In a specific example, an emitter array or subset thereof (such as a subset of the emitters, the substrate, support material, etc.) can be oxidized, which can function to electrically insulate the emitter array or subset thereof. In a related example, structure (e.g., emission structure, emitter, guard emitter, etc.) can be partially or fully oxidized to modify or shape an electric field proximal the structure.

In a second specific example, an emitter array can include stress-released structures (e.g., released stress structures). For instance, a substrate such as silicon, can be coated with (e.g., conformally, partially, according to a pattern, etc.) a first layer with a first internal stress, which can be coated with (e.g., conformally, partially, according to a pattern, etc.) a second layer with a second internal stress. However, any suitable number of layers can be formed. The first layer can include silicon oxide (such as $SiO_x$, $SiO_2$, etc.) and/or any suitable emitter or coating material. The second layer can include silicon nitride (such as $Si_3N_4$, $SiN_x$, etc.) and/or any suitable emitter or coating material. The first internal stress is preferably compressive (e.g., a stress between about −500 and 0 MPa such as −50, −100, −200, −250, −300, −400, −450 MPa, values therebetween, etc.; compressive relative to the second internal stress; compressive compared to the substrate, etc.), but can alterantivley be tensile. The second internal stress is preferably tensile (e.g., a stress between about 0 MPa and 500 MPa such as 50, 100, 200, 250, 300, 400, 450 MPa, values therebetween, etc.; tensile relative to the first internal stress; tensile relative to the substrate; etc.), but can alternatively be compressive. The internal stresses of the first and second layer can be mechanically applied, produced by mismatch between the thermal properties of the layer materials (e.g., a mismatch in the layers' coefficient of thermal expansion), produced by a lattice mismatch within the material (e.g., caused by dopants), produced by a lattice mismatch at an interface (e.g., an interface between the layers, an interface between a layer and the substrate, etc.), and/or otherwise applied. The magnitude of the first and second internal stress can be the same or different. The thickness of the first and second layer can be between 50 nm and 10 μm (such as 100 nm, 200 nm, 500 nm, 1 μm, 2 μm, 2.5 μm, 3 μm, 5 μm, 7.5 μm, 10 μm, values therebetween, etc.), be thinned than 50 nm, be thicker than 10 μm, and/or have any suitable thickness. The thickness of the first and second layer can be the same or different. The resulting materials can be patterned (e.g., using lithography or other patterning techniques such as to create the structures) and etched (e.g., etching the substrate, first layer, and/or second layerl; which can function to release the layer(s) from each other and/or from the substrate). Upon etching, the internal stresses can be released, resulting in deformation to form an out-of-plane structure (e.g., the emitter array). The final structure (e.g., shape, bending, size, etc.) can depend on the first internal stress, the second internal stress, the magnitude of the difference between the first internal stress and the second internal stress, the etch pattern, the first layer material, the second layer material, the first layer thickness, the second layer thickness, and/or otherwise depend on the manufacturing. The final structure can optionally be oxidized and/or have another material deposited thereupon (e.g., coating the resulting strcutre, coating the substrate, etc.). However, the emitter array and/or emitters thereof can be otherwise formed.

4. Illustrative Example

In an illustrative example, an emitter array can include a plurality of emitters. As shown in FIGS. 10, 11A, and 11B, each of the emitters can have substantially the same geometry. The emitter geometry can include a sun-shaped ingress port, a first volume that tapers to a second volume, where the cross-sectional shape of the first volume substantially matches the ingress port shape, where the second volume ends at a circular egress port, where the walls defining the second volume are substantially. The egress port can have a diameter (e.g., inner diameter, outer diameter) that is about 5 μm. The first volume can have a diameter (e.g., inner diameter, outer diameter, largest diameter, smallest diameter, etc.) that is about 40 μm. The emitter height above the substrate can be about 100 μm. The first capillary can be surrounded (e.g., radially symmetrically) with support material (e.g., substrate). The support material can have an outer diameter that is about 100 μm. The support material and substrate can be made of silicon. The first and second volumes (e.g., the walls defining the first and second volume) can be made of silicon dioxide. The support material and/or substrate can include a dielectric coating (e.g., silicon dioxide) on the outer surface of the support material and/or substrate.

In a related example, the emitter array can include a first subset of emitters that is coupled to a reservoir and a second subset of emitters that is decoupled from the reservoir (e.g., guard emitters). The number of emitters in the second subset can be less than, the same as, and/or more than the number of emitters in the first subset.

In a second specific example, as shown in FIGS. 14, 15A-15C, and FIGS. 16A-16B, an emitter array can include a substrate that includes a channel configured to feed working material to a plurality of emitters (e.g., chevron shaped emitters). The emitters of the plurality are preferably the same, but can be different. Each emitter preferably includes channels that are in fluid communication with the substrate channel (e.g., a distributary of the substrate channel). The channels can be in a top or outer surface (e.g., the surface distal the substrate) of the emitter, a bottom or inner surface (e.g., the surface facing the substrate) of the emitter, an internal volume of the emitter, and/or otherwise be arranged along or within the emitter. The channels can run the height or length of the emitter (e.g., along both arms of the V-shape), be along a single arm of the V-shape, be along a portion of the V shape (e.g., extend from the substrate partially up one or both arms), and/or otherwise run along any suitable length of the emitter. Working fluid is preferably emitted proximal to a tip of the emitter, where a radius of curvature of the tip is preferably between about 100 nm and 5 μm. Variations of this specific example can include guard emitters, where channels in the guard emitters are not directly fluidly coupled to the substrate channels (e.g., a channel of the guard emitter is not fluidly connected to the substrate channels, guard emitter does not include a channel, etc.). The guard emitter is preferably chevron shaped (e.g., prismatic chevron, inverted v-shapes, pyramids with a triangular prismatic through-hole through the base, etc.), but can be cylindrical and/or have any suitable shape.

However, the emitter(s) and/or emitter array can have any suitable geometry.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. An electrospray apparatus comprising:
   a substrate defining a channel;
   a plurality of chevron shaped emitters, each emitter of the plurality defining an indentation in fluid communication with the channel, wherein a working material within the indentation is exposed to an external environment proximal the emitter, wherein a height of an emitter of the plurality of emitters is between 50 and 200 pm, and wherein the chevron shape is an open chevron shape and the emitters protrudes directly from the substrate.

2. The electrospray apparatus of claim 1, wherein a radius of curvature of a tip of the emitter is between 10 nm and 10 μm.

3. The electrospray apparatus of claim 1, wherein the substrate comprises a chevron-shaped guard emitter that is not in fluid communication with the channel.

4. The electrospray apparatus of claim 3, wherein the chevron-shaped guard emitter is proximal a periphery of the plurality of chevron shaped emitters.

5. The electrospray apparatus of claim 1, wherein the plurality of chevron shaped emitters is configured to emit working material, wherein during emission an electrical potential applied to the working material at least 1 ms before the electrical potential is applied to the substrate.

6. The electrospray apparatus of claim 1, wherein the plurality of emitters comprise stress-released structures.

7. The electrospray apparatus of claim 1, wherein the plurality of chevron shaped emitters are connected to the channel via a plurality of distributaries, wherein working material within the distributaries are exposed to the external environment.

8. The electrospray apparatus of claim 1, wherein the channel comprises a distal electrode.

9. The electrospray apparatus of claim 8, wherein the distal electrode comprises a specific surface area that is at least 100 meters squared per gram ($m^2\ g^{-1}$).

10. The electrospray apparatus of claim 1, wherein the channel and the indentations are configured to be wet by an ionic liquid.

11. The electrospray apparatus of claim 3, wherein the chevron-shaped guard emitter is not in direct fluid communication with the channel.

12. The electrospray apparatus of claim 1, wherein the indentation is directly exposed to the external environment proximal the emitter via a path that does not pass through the emitter.

* * * * *